US012619677B2

(12) United States Patent
Wallner et al.

(10) Patent No.: US 12,619,677 B2
(45) Date of Patent: May 5, 2026

(54) BINARY OPTIMIZATION USING SHALLOW BOSON SAMPLING

(71) Applicant: ORCA Computing Limited, London (GB)

(72) Inventors: Hugo Wallner, London (GB); Kamil Bradler, Toronto (CA)

(73) Assignee: ORCA Computing Limited, London (GB)

( * ) Notice: Subject to any disclaimer, the term of this patent is extended or adjusted under 35 U.S.C. 154(b) by 1121 days.

(21) Appl. No.: 17/670,284

(22) Filed: Feb. 11, 2022

(65) Prior Publication Data

US 2023/0133597 A1      May 4, 2023

(30) Foreign Application Priority Data

Oct. 28, 2021   (GB) ...................................... 2115490
Nov. 24, 2021   (GB) ...................................... 2116924

(51) Int. Cl.
*G06F 17/11*         (2006.01)
*G06N 10/60*        (2022.01)

(52) U.S. Cl.
CPC ............. *G06F 17/11* (2013.01); *G06N 10/60* (2022.01)

(58) Field of Classification Search
CPC ........ G06F 17/11; G06N 10/20; G06N 10/40; G06N 10/60
See application file for complete search history.

(56) References Cited

U.S. PATENT DOCUMENTS

| | | | |
|---|---|---|---|
| 2015/0354938 A1 | 12/2015 | Mower et al. | |
| 2021/0096384 A1* | 4/2021 | Bradler | H04B 10/27 |
| 2021/0287773 A1 | 9/2021 | Lam et al. | |
| 2022/0172092 A1* | 6/2022 | Roman | G06N 20/00 |

FOREIGN PATENT DOCUMENTS

| | | |
|---|---|---|
| WO | WO 2020/232546 A1 | 11/2020 |
| WO | WO 2022/058757 A1 | 3/2022 |
| WO | WO 2023/012375 A1 | 2/2023 |

OTHER PUBLICATIONS

Brod et al., "Photonic implementation of boson sampling: a review", in Advanced Photonics, vol. 1, Issue 3, 034001 (May 2019). https://doi.org/10.1117/1.AP.1.3.034001 (Year: 2019).*
Arrazola et al., "Quantum approximate optimization with Gaussian boson sampling", Physical Review A 98, 012322 (2018), DOI: 10.1103/PhysRevA.98.012322 (Year: 2018).*
Tillman et al., "Experimental boson sampling", arXiv:1212.2240v1 (Year: 2012).*

(Continued)

*Primary Examiner* — Carlo Waje
(74) *Attorney, Agent, or Firm* — Fenwick & West LLP

(57) ABSTRACT

The present disclosure describes a system with a boson sampler that generates an output bosonic state by performing a transformation on an input bosonic state and produces measurement outcomes indicating the presence or absence of bosons in output modes. A controller of the system receives these measurement outcomes, generates binary sequences based on the presence or absence of bosons, and determines a solution to a binary optimization problem.

19 Claims, 14 Drawing Sheets

(56)     References Cited

OTHER PUBLICATIONS

Zhong et al., "Experimental Gaussian Boson sampling", Science Bulletin vol. 64, Issue 8, Apr. 30, 2019, pp. 511-515, https://doi.org/10.1016/j.scib.2019.04.007 (Year: 2019).*

Aaronson, S. et al., "The Computational Complexity of Linear Optics," arXiv:1011.3245, Nov. 14, 2010, pp. 1-94.

Bradler, K. et al., "Certain properties and applications of shallow bosonic circuits," arXiv:2112.09766, Dec. 17, 2021, pp. 1-34.

Gard, B.T. et al., "An introduction to boson-sampling," arXiv:1406.6767, Jun. 26, 2014, pp. 1-13.

Reck, M. et al., "Experimental realization of any discrete unitary operator," Physical Review Letters, vol. 73, Jul. 1994, pp. 58-61.

Banchi, L. et al. "Training Gaussian boson sampling distributions," *Physical Review A*, vol. 102, No. 1, Jul. 15, 2020, 15 pages.

Crespi, A. et al. "Integrated multimode interferometers with arbitrary designs for photonic boson sampling," *Nature Photonics*, vol. 7, No. 7, Jul. 2013, 5 pages.

Olson, J.P. et al. "Sampling arbitrary photon-added or photon-subtracted squeezed states is in the same complexity class as boson sampling," *Physical Review A*, vol. 91, No. 2, Feb. 17, 2015, 6 pages.

PCT International Search Report, PCT Application No. PCT/GB2022/052731, Jan. 23, 2023, 5 pages.

Su, D. et al. "Error mitigation on a near-term quantum photonic device," *arXiv preprint arXiv:2008.06670*, Aug. 15, 2020, 20 pages.

UK Intellectual Property Office, Examination Report and Written Opinion, UK Patent Application No. GB2116924.8, Mar. 28, 2024, 6 pages.

Wang, H. et al. "Boson sampling with 20 input photons and a 60-mode interferometer in a $10^{14}$ dimensional hilbert space," *Physical Review Letters*, vol. 123, No. 25, Dec. 18, 2019, 23 pages.

* cited by examiner

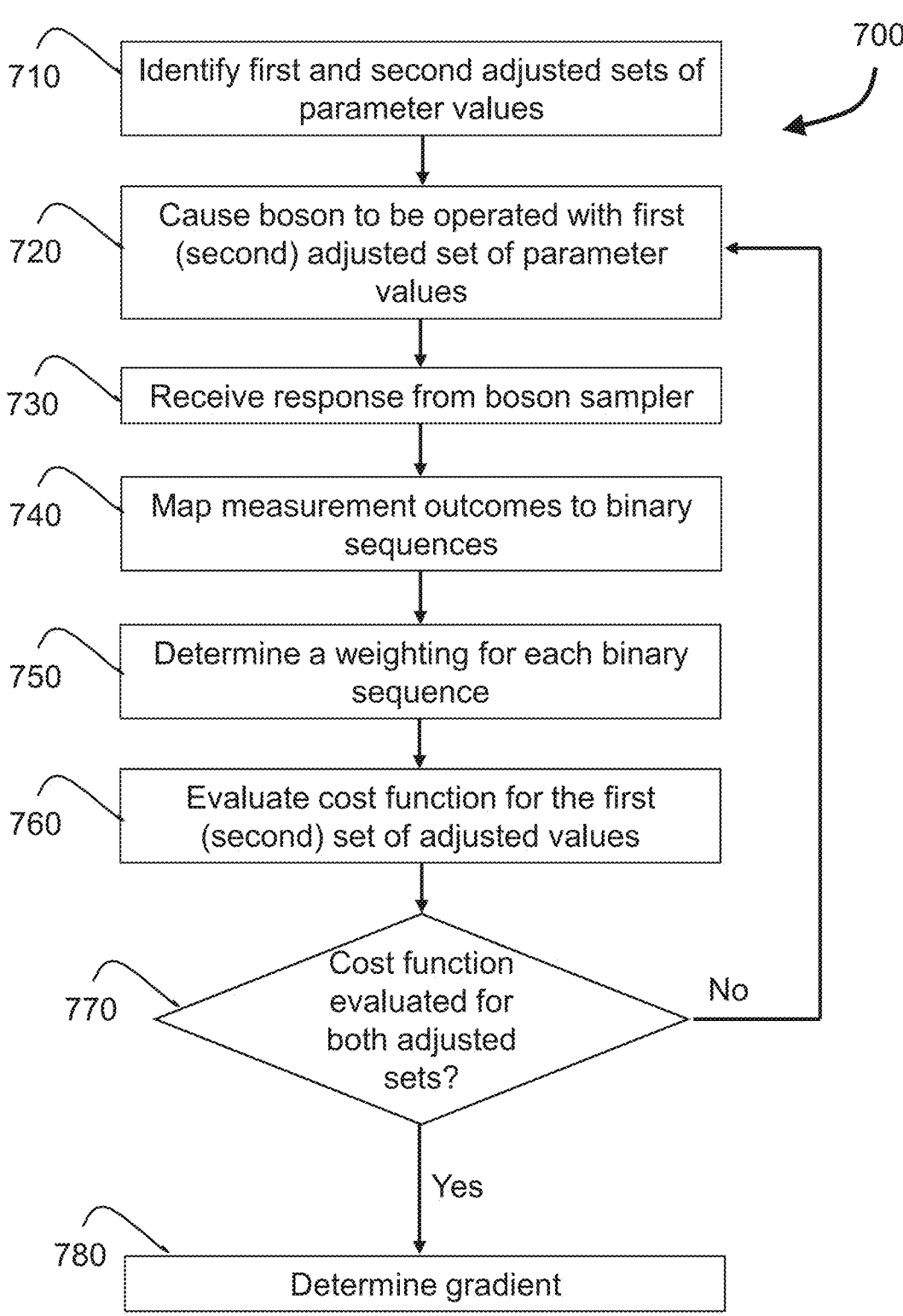

710  Identify first and second adjusted sets of parameter values

700

720  Cause boson to be operated with first (second) adjusted set of parameter values 730  Receive response from boson sampler 740  Map measurement outcomes to binary sequences 750  Determine a weighting for each binary sequence 760  Evaluate cost function for the first (second) set of adjusted values 770  Cost function evaluated for both adjusted sets?

No

Yes

780  Determine gradient

BINARY OPTIMIZATION USING SHALLOW BOSON SAMPLING

CROSS-REFERENCE TO RELATED APPLICATION

This application claims priority to United Kingdom Application No. GB2116924.8, "Binary Optimization Using Shallow Boson Sampler," filed on Nov. 24, 2021 and claims priority to United Kingdom Application No. GB2115490.1, "Binary Optimization with Boson Sampling," filed on Oct. 28, 2021, each of which is hereby incorporated by reference in its entirety.

TECHNICAL FIELD

The present disclosure relates to methods and systems for addressing binary optimization problems. More particularly, the present disclosure relates to methods and systems that utilize one or more boson sampling devices to determine solutions to binary optimization problems.

BACKGROUND

Binary optimization problems are a subclass of combinatorial optimization problems in which the variables are restricted to one of two values. A binary optimization problem can generally be stated as a problem of reducing (e.g., minimizing) or increasing (e.g., maximizing) an objective function of variables that can take one of two values, for example 0 or 1.

One famous binary optimization problem is the Quadratic Unconstrained Binary Optimization (QUBO) problem, which is also known as the Unconstrained Binary Quadratic Programming (UBQP) problem. The task is to find a binary sequence b of length L that minimises the objective function $b^T Q b$ where Q is an L×L symmetric matrix having real values. Many problems of real-world relevance can be cast into a QUBO form. QUBO is known to be an NP hard problem and so is intractable on a classical computer when the number L of binary variables is large.

Techniques for solving binary optimization problems are desirable.

SUMMARY

Some embodiments relate to a system for determining a solution to a binary optimization problem is provided. The system comprises a boson sampler and a controller.

The boson sampler comprises a state generation module for generating an input multimodal bosonic state comprising a plurality of input modes. The boson sampler further comprises a linear bosonic circuit for performing a parametrised unitary transformation of the input multimodal bosonic state to an output multimodal bosonic state comprising a plurality of output modes. The boson sampler further comprises a state detection module for performing measurements on output modes of the output multimodal bosonic state to produce measurement outcomes, wherein each measurement outcome indicates the presence or absence of bosons in measured output modes of the multimodal output bosonic state.

The controller is operable to (i) initialise a set of parameter values, the set of parameter values for defining the parametrised unitary transformation of the boson sampler. The controller is further operable to (ii) for at least one selected parameter, use the boson sampler to determine a gradient of a cost function with respect to that selected parameter. The controller is further operable to (iii) using the at least one determined gradient, update the set of parameter values. The controller is further operable to (iv) repeat (ii) and (iii) until a stopping condition is satisfied. The controller is further operable to (v) after the stopping condition is satisfied, cause the boson sampler to be operated with the finalised set of parameter values. The controller is further operable to (vi) receive a response from the boson sampler, the response representative of an empirical probability distribution of measurement outcomes. The controller is further operable to (vii) map each distinct measurement outcome to a binary sequence of a plurality of binary sequences, wherein each element of a binary sequence corresponds to a measured output mode of the output multimodal bosonic state and has a value based on whether one or more bosons were present or absent in that corresponding measured output mode. The controller is further operable to (viii) for at least two binary sequences to which a measurement outcome is mapped, evaluate an objective function using the binary sequence to determine a corresponding function value, the objective function characteristic of the binary optimization problem. The controller is further operable to (ix) identify, based at least in part on a comparison of the function values, a binary sequence as a solution to the binary optimization problem.

Advantageously, the system described herein exploits both a classical computing resource and a quantum computing resource in the form of a boson sampler, to determine a solution to a binary optimization problem. By exploiting bosonic statistics and mapping measurement outcomes to binary sequences based on the presence or absence of bosons in an output mode, the system is able to handle even large binary optimization problems (those for which the candidate solutions have a large number of elements). Furthermore, the boson sampler does not require boson number resolving detectors as only the presence or absence of bosons need be determined, and this means that less sensitive detectors are required within the state detection module.

The linear boson circuit may be a shallow bosonic circuit. A shallow bosonic circuit is understood to mean a bosonic circuit that is not a full-depth bosonic circuit. A full-depth bosonic circuit is a bosonic circuit that comprises suitable parametrised multimodal operations such that a boson in any input mode of the input multimodal bosonic state may be scattered to any output mode of the output multimodal bosonic state. In a shallow circuit, there are limitations on how the bosons of the input modes can be scattered to the output modes of the output multimodal bosonic state.

The use of a mapping based on the presence or absence of bosons enables a shallow bosonic circuit to be used in the boson sampler. A shallow bosonic circuit uses (e.g., requires) fewer multimodal operations than a full-depth circuit and accordingly the (shallow) boson sampler requires fewer components (e.g. reconfigurable beam splitters) to perform the tasks described herein than a full-depth boson sampler. This provides several advantages: firstly, loss is a major source of error in photonic operations (a key platform for boson sampling) and the fewer components required, the lower the loss; and second, the fewer the components, the smaller the parameter space that is traversed in the process described herein, which means that there are fewer parameter values to update.

The input multimodal bosonic state may comprise M input modes (where M is an integer). The linear bosonic circuit may comprise fewer than $M(M-1)/2$ parametrised multimodal operations.

The boson sampler may comprise a photonic boson sampler.

The plurality of input modes may comprise a plurality of temporal modes. For example, the input multimodal bosonic states may comprise a train of single photons, each spaced apart in time by a fixed amount, such that each photon can be said to be in its own time bin/temporal mode.

The linear bosonic circuit may comprise one or more temporal mode coupling devices.

A temporal mode coupling device may comprise a reconfigurable beam splitter and a delay line, the delay line configured to connect one input port of the reconfigurable beam splitter with one output port of the reconfigurable beam splitter.

A temporal mode coupling device may comprise a quantum memory. The quantum memory may be configured to place the photons of a temporal mode in a quantum superposition of being stored in the memory and not stored in the memory. The quantum memory may then interact the stored part with a subsequent temporal mode. That is, the quantum memory may be treated provide similar functionality to a reconfigurable beam splitter and delay line.

The plurality of input modes may comprise a plurality of spatial modes. For example, input ports/paths to an interferometer may be thought of as spatial modes.

The linear bosonic circuit may comprise an interferometer. The interferometer may comprise M input ports for inputting the M input modes of the input multimodal bosonic state into the interferometer. The interferometer may further comprise M output ports for outputting the M output modes of the output multimodal bosonic state from the interferometer. The interferometer may further comprise a plurality of waveguides arranged to pass through the interferometer to connect the M input ports to the M output ports. The plurality of waveguides may be arranged to provide a plurality of coupling locations between pairs of the plurality of waveguides. A reconfigurable beam splitter may be arranged at each of the coupling locations such that at each coupling location the two modes of electromagnetic radiation carried by the two respective waveguides are capable of coupling with each other with a reconfigurable reflection coefficient.

The plurality of coupling locations may be arranged such that at least one of the M input modes couples with each of the other $M-1$ modes in the interferometer.

The interferometer may comprise fewer than $M(M-1)/2$ coupling locations.

The linear bosonic circuit may be comprised in an integrated photonic circuit. That is, an integrated photonic circuit may comprise the linear interferometer. The integrated circuit may further comprise one or more single photon sources. The integrated circuit may further comprise one or more detectors.

A reconfigurable beam splitter is understood to mean any tuneable device or tuneable collection of devices capable of coupling two modes of electromagnetic radiation with each other with a reconfigurable effective reflection/transmission coefficient. A reconfigurable beam splitter may be capable of coupling modes with both a reconfigurable reflection coefficient and a reconfigurable phase coefficient.

A reconfigurable beam splitter may comprise a Mach-Zehnder interferometer. For example, a Mach-Zehnder interferometer may comprise two 50:50 beam splitters with a reconfigurable thermo-optic phase shifter on one internal path between the two 50:50 beam splitters. Optionally, a further phase shifter may be arranged on an external path (input or output) of a Mach-Zehnder interferometer.

The state generation module may comprise one or more single photon sources.

Mapping each measurement outcome to a binary sequence may comprise mapping each measurement outcome to a binary sequence according to a first mapping under which each element of a binary sequence has a first value if one or more bosons were present in the corresponding measured output mode and a second value if no bosons were present in the corresponding measured output mode. The controller may be further operable to repeat (i) to (viii) (before (ix)), wherein mapping each measurement outcome to a binary sequence comprises mapping each measurement outcome to a binary sequence according to a second mapping under which each element of a binary sequence has the second value if one or more bosons were present in the corresponding measured output mode and the first value if no bosons were present in the corresponding measured output mode.

Using the boson sampler to determine a gradient of the cost function with respect to a selected parameter may comprise a) identifying first and second adjusted sets of parameter values, wherein the first adjusted set comprises the set of parameter values with the parameter value of that selected parameter adjusted positively by an amount, and wherein the second adjusted set comprises the set of parameter values with the parameter value of that selected parameter adjusted negatively by the same amount. Using the boson sampler to determine a gradient of the cost function with respect to a selected parameter may further comprise b) for each of the first and second adjusted sets: causing the boson sampler to be operated with the adjusted set of parameter values: receiving a response from the boson sampler, the response representative of an empirical probability distribution of measurement outcomes: mapping each distinct measurement outcome to a binary sequence of a plurality of binary sequences, wherein each element of a binary sequence corresponds to a measured output mode of the output multimodal bosonic state and has a value based on whether one or more bosons were present or absent in that corresponding measured output mode: determining, from the empirical probability distribution of measurement outcomes, a weighting for each binary sequence to which a measurement outcome is mapped; and evaluating the cost function for the adjusted set using the plurality of binary sequences and the weightings of the binary sequences to obtain an adjusted cost value. Using the boson sampler to determine a gradient of the cost function with respect to a selected parameter may comprise c) determining, from the adjusted cost values for the first and second adjusted sets, a gradient of the cost function with respect to that selected parameter.

Identifying, based at least in part on a comparison of the function values, a binary sequence as a solution to the binary optimization problem may further comprise identifying a binary sequence based on a comparison of the function values and a function value stored in memory.

Determining a gradient of a cost function with respect to a selected parameter may include evaluating the objective function using each a set of binary sequences to provide a plurality of function values, and optionally storing in memory a binary sequence corresponding to the minimum function value found when determining a gradient. Advantageously, taking such an action helps to retain the optimal value if found while evaluating the objective function before the stopping condition is met.

The system may further comprise a second boson sampler. Advantageously, the system may then perform the hybrid quantum-classical process described herein using a first boson sampler and a first mapping, and in parallel using a second boson sampler and a second mapping complementary to the first mapping. That is, the system may be capable of parallel processing. By taking advantage of parallel processing in this way, the system may advantageously determine a solution efficiently.

The state generation module may be configured to generate an input multimodal bosonic state comprising M input modes, each input mode comprising a boson. Each binary sequence of the plurality of binary sequences may have a number L of elements that is fewer than or equal to the number of output modes M of the output multimodal bosonic state.

The binary optimization problem may comprise a quadratic unconstrained binary optimization, QUBO, problem. For example, the QUBO problem may comprise a travelling salesman type problem. The binary optimization problem may comprise a portfolio optimization problem.

Some embodiments relate to a method for determining a solution to a binary optimization problem using a boson sampler. The boson sampler is operable to prepare an input multimodal bosonic state. The boson sampler is further operable to perform a parametrised unitary transformation of the input multimodal bosonic state to an output multimodal bosonic state comprising a plurality of output modes. The boson sampler is further operable to perform measurements on output modes to produce measurement outcomes, wherein each measurement outcome indicates the presence or absence of bosons in measured output modes of the output multimodal bosonic state.

The method comprises (i) initialising a set of parameter values, the set of parameter values for defining the parametrised unitary transformation of the boson sampler. The method further comprises (ii) for at least one selected parameter, using the boson sampler to determine a gradient of a cost function with respect to that selected parameter. The method further comprises (iii) using the at least one determined gradient, updating the set of parameter values. The method further comprises (iv) repeating (ii) and (iii) until a stopping condition is satisfied. The method further comprises (v) after the stopping condition is satisfied, causing the boson sampler to be operated with the finalised set of parameter values. The method further comprises (vi) receiving a response from the boson sampler, the response representative of an empirical distribution of measurement outcomes. The method further comprises (vii) mapping each distinct measurement outcome to a binary sequence of a plurality of binary sequences, wherein each element of a binary sequence corresponds to a measured output mode of the output multimodal bosonic state and has a value based on whether one or more bosons were present or absent in that corresponding measured output mode. The method further comprises (viii) for each of at least two binary sequences to which a measurement outcome is mapped, evaluating an objective function using the binary sequence to determine a corresponding function value, the objective function characteristic of the binary optimization problem. The method further comprises (ix) identifying, based at least in part on a comparison of the function values, a binary sequence as a solution to the binary optimization problem.

Some embodiments relate to a computer-readable medium. The computer-readable medium has instructions stored thereon that, when executed by one or more processors in communication with a boson sampler, cause a method for determining a solution to a binary optimization problem to be executed.

A computer program and/or the code/instructions for performing such methods as described herein may be provided to an apparatus, such as a computer, on a computer-readable medium or computer program product. The computer-readable medium may comprise a non-transitory computer-readable medium. The computer-readable medium could be, for example, an electronic, magnetic, optical, infrared, electromagnetic, or semiconductor system, or a propagation medium for data transmission, for example for downloading the code over the Internet. Alternatively, the computer-readable medium could take the form of a physical computer-readable medium such as a semiconductor or solid-state memory, magnetic tape, a removable computer diskette, a random access memory (RAM) a read-only memory (ROM), a rigid magnetic disc, and an optical disk, such as a CD-ROM, CD-RW or DVD.

Some embodiments relate to a computing apparatus/ computing device for determining a solution to a binary optimization problem. The computing apparatus comprises one or more processors. The computing apparatus further comprises one or more computer-readable storage media having stored thereon instructions that, when executed by the one or more processors while the computing apparatus is in communication with a boson sampler, cause the computing apparatus to: (i) initialise a set of parameter values, the set of parameter values for defining the parametrised unitary transformation of the boson sampler: (ii) for at least one selected parameter, use the boson sampler to determine a gradient of a cost function with respect to that selected parameter: (iii) using the at least one determined gradient, update the set of parameter values: (iv) repeat (ii) and (iii) until a stopping condition is satisfied: (v) after the stopping condition is satisfied, cause the boson sampler to be operated with the finalised set of parameter values: (vi) receive a response from the boson sampler, the response representative of an empirical distribution of measurement outcomes: (vii) map each distinct measurement outcome to a binary sequence of a plurality of binary sequences, wherein each element of a binary sequence corresponds to a measured output mode of the output multimodal bosonic state and has a value based on whether one or more bosons were present or absent in that corresponding measured output mode: (viii) for each of at least two binary sequences to which a measurement outcome is mapped, evaluate an objective function using the binary sequence to determine a corresponding function value, the objective function characteristic of the binary optimization problem; and (ix) identify, based at least in part on a comparison of the function values, a binary sequence as a solution to the binary optimization problem.

Many modifications and other embodiments set out herein will come to mind to a person skilled in the art in light of the teachings presented herein. Therefore, it will be understood that the disclosure herein is not to be limited to the specific embodiments disclosed herein. Moreover, although the description provided herein provides example embodiments in the context of certain combinations of elements, steps and/or functions may be provided by alternative embodiments without departing from the scope of the disclosure.

BRIEF DESCRIPTION OF THE DRAWINGS

Embodiments of the disclosure will now be described by way of example only, with reference to the accompanying figures, in which:

FIG. 7 shows a flow chart of a method for determining a gradient of a cost function with respect to a parameter;

Throughout the description and the drawings, like reference numerals refer to like parts.

DETAILED DESCRIPTION

Figure 1:
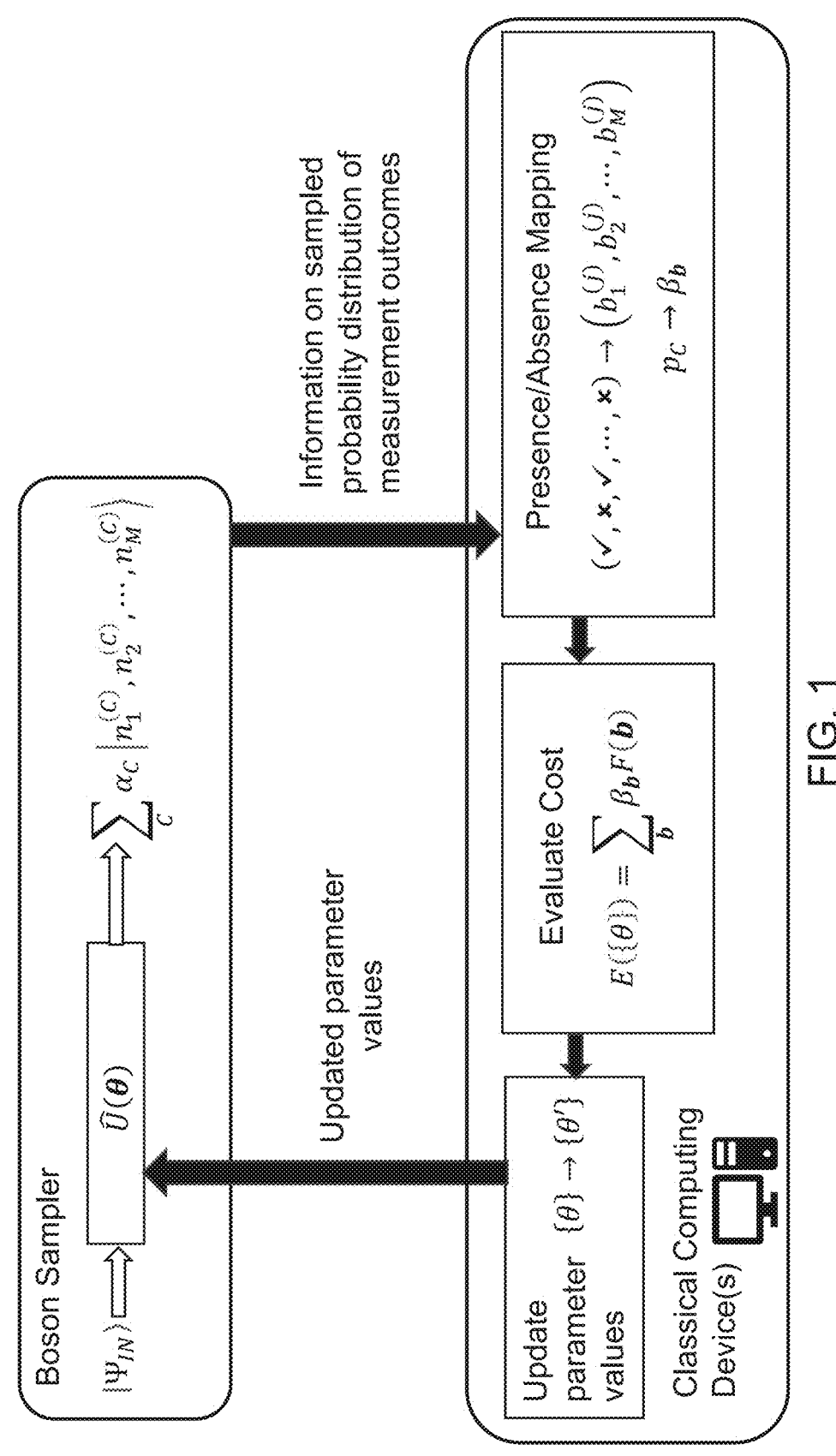
FIG. 1 shows an illustration of a quantum-classical hybrid algorithm for determining a solution to a binary optimization problem.

Whilst various embodiments are described below, the disclosure is not limited to these embodiments, and variations of these embodiments may well fall within the scope of the disclosure.

A binary sequence is understood to mean any ordered sequence of elements that can take one of two values. In some examples, elements of a binary sequence may take a value of 0 or 1. In other examples, elements of a binary sequence may take a value of $-1$ or 1.

The term "unitary transformation" as used herein is understood to mean substantially unitary. For example, loss or other errors may mean that a transformation imparted by a boson sampler is not an exact unitary transformation, but the skilled person will appreciate that the methods and systems described herein are also applicable in such circumstances.

Many binary optimization problems are NP hard and so cannot be reliably solved on a classical computer alone. As the number L of variables increases, the number of candidate solutions increases exponentially as 24. An exhaustive search through all candidate solutions to find an optimal solution may be impractical for large numbers of binary variables.

Quantum computers/quantum information processors promise to provide solutions to many problems that are intractable on classical computers. To date, many different physical implementations and models for quantum computing have been proposed. Physical implementations proposed for quantum computing include nuclear magnetic resonance, ion traps, superconductors, quantum dots, electrons on liquid helium, solid state spectroscopy, and photonic quantum computing to name but a few. While quantum computing has advanced to the point at which "quantum supremacy" has been achieved, the technology is still in its infancy and a practical universal quantum computer—a quantum computer capable of efficiently simulating any other quantum computer—is not expected to be implemented in the near term.

In part to address the lack of any powerful universal quantum computing resources, several quantum-classical hybrid algorithms have been proposed. In a quantum-classical hybrid algorithm, both classical and quantum resources are used to perform a computational task. Variational Quantum Eigensolvers (VQEs) are one such category of hybrid quantum-classical algorithms designed to compute ground state energies of quantum Hamiltonians, and have been used to find, for example, ground state energies of interacting fermionic Hamiltonians. However. VQEs still typically require quantum resources that are beyond those available currently or in the short-to-medium term. In particular. VQEs often require quantum computing resources that are able to perform a universal set of quantum logic operations on qubits, and the ability to measure quantum states in a plurality of complementary bases as required.

Described herein are methods and systems that utilise boson sampling as part of a quantum-classical hybrid algorithm to address binary optimization problems. A boson sampler is a non-universal quantum computer that is significantly more straightforward to build than any universal quantum computer proposed so far. In boson sampling, one generates an input bosonic state (for example a photonic state comprising a plurality of photons), applies a transformation to that input bosonic state (for example, by sending the photons through a linear interferometer), and samples from the output distribution. A boson sampler/boson sampling device is operable to prepare an input multimodal bosonic state, to perform a transformation of the input bosonic state to an output multimodal bosonic state, and to perform measurements on output modes of the output multimodal bosonic state. The measurements performed are typically based on the number of bosons in each output mode. For a given input state, one can with repeated operations of the boson sampler build up an empirical probability distribution of bosonic configurations of the output state. For an introduction to boson samplers, the reader is directed to B. Gard et al. "An Introduction to Boson Sampling", Quantum Physics ArXiv 1406.6767, and to S. Aaronson and A. Arkhipov, "The computational complexity of linear optics", Proceedings of the forty-third annual ACM symposium on theory of computing, pages 333-342, ACM, 2011.

To understand boson sampling, one may find it useful to think of a classical Galton board. When using a traditional Galton board, a plurality of substantially identical balls are dropped from an entrance hole one by one onto a vertical lattice of pegs, each of which randomly scatters the incoming balls onto pegs below, and the balls are collected in receptacles at the bottom of the board. Traditionally, the arrangement of the pegs on the Galton board ensures that with enough balls, the distribution of balls in each receptacle approaches the binomial distribution. If one reconfigures the arrangement of pegs, one can see a different distribution of the balls in the receptacles. If one adapts the Galton board to provide further entrance holes, then multiple balls may be dropped from an appropriate choice of the entrance holes to provide a selected input configuration. The input configuration of balls will then fall through the peg arrangement to the receptacles.

Somewhat analogously, in a boson sampler, bosons may be initially arranged in some input configuration in which each boson occupies one of several input modes (analogous to multiple entrance holes on the adapted Galton board, except that in the adapted Galton board only a single ball can be dropped from any particular entrance hole at a time, while an input mode of a boson sampler may take more than one boson). The input modes may comprise, for example, spatial modes such as input ports to an interferometer (analogous to the spatial arrangement of the multiple entrance holes of the adapted Galton board), or may comprise other modes, for example temporal modes, that describe some other quantum degree of freedom of the bosonic system.

The input multimodal bosonic state generated for the boson sampler is typically a product state (i.e. no quantum entanglement between input modes) comprising N bosons distributed across M input modes. For illustrative purposes only, the present discussion is restricted to the case where the number of bosons N is less than or equal to the number of input modes M, and where one boson is provided in any input mode. The skilled person will appreciate that the methods and systems described herein are also applicable when one or more input modes comprise more than one boson. Accordingly, in the present discussion the input state can without loss of generality be expressed as $$|\Psi_{IN}\rangle = |1_1, 1_2, \dots, 1_N, 0_{N+1}, \dots, 0_M\rangle = \hat{a}_1^\dagger \dots \hat{a}_N^\dagger |0_1, \dots, 0_M\rangle \quad \text{(EQ. 1)}$$

where $$\hat{a}_k^\dagger$$

is the bosonic creation in the $k^{th}$ mode.

In contrast to the balls of the Galton board, bosons are quantum objects and are governed by bosonic statistics. This is starkly exemplified by the famous Hong-Ou-Mandel effect: if two single photons are incident on a 50/50 beam splitter at the same time, one in each of two input modes (input paths) of the beam splitter, then due to interference the output modes (output paths) taken by the photons become entangled. The output state can be expressed as a superposition of two configurations-one in which both photons are deflected to a first output mode and one in which both photons are deflected to the second output mode. Due to interference, other conceivable possibilities such as each output path carrying a single photon are cancelled out. The probability of the two photons being found in a particular one of the output modes is 50%.

A boson sampler applies some transformation to the input multimodal bosonic state to produce an output multimodal bosonic state. This transformation may also be referred to as a linear bosonic circuit. A linear bosonic circuit may be modelled as a unitary transformation, although loss and other factors may mean that the transformation is not exactly unitary i.e. the linear bosonic circuit may be a substantially unitary transformation. For example, photons passing through a beam splitter may be lost due to some kind of absorption at the beam splitter or scattering due to some mode not measured by the device. In this example, photon loss may mean that the number of photons in the input state and output state is not conserved, which means that the transformation is not exactly unitary. Thus, the term "unitary transformation" as used herein may include a transformation that is substantially unitary. Furthermore, a skilled person will appreciate that the methods and systems described herein are still applicable in circumstances where the transformation is not exactly unitary. The unitary transformation acts on the creation operators as $$\hat{U}(\theta)\hat{a}_i^\dagger \hat{U}(\theta) = \sum_{j=1}^M U_{i,j}(\theta)\hat{a}_j^\dagger \quad \text{(EQ. 2)}$$

where $\hat{U}(\theta)$ is a unitary matrix. The linear bosonic circuit is defined by a set of parameters $\theta$. One or more of the parameters $\theta$ may characterise a single mode operation. For example, a parameter may characterise the phase shift imparted by a phase shifter of a passive linear photonic network. One or more of the parameters $\theta$ may characterise a multimodal operation. For example, a parameter may characterise a transmission (or equivalently, a reflection) coefficient of a reconfigurable beam splitter in a passive linear photonic network. If the values $\{\theta\}$ of one or more of the parameters $\theta$ may be reconfigured then the boson sampler is said to be a reconfigurable boson sampler.

Boson sampling is well-defined for any bosonic particles, and the way in which the linear bosonic circuit is implemented depends on the boson sampling system of interest. The linear bosonic circuit may be a physical part or module of the boson sampler. For example, in photonics, the linear bosonic circuit may comprise a passive linear photonic network/passive linear interferometer comprising reconfigurable beam splitters, phase shifters and other passive linear optical elements suitable for transforming an input multimodal photonic state to an output multimodal photonic state. In other examples, the linear bosonic circuit may not be a physical module of the boson sampler and may be implemented instead as an ordered sequence of controlled operations applied to the bosons of the system of interest. In what follows, the linear bosonic circuit will often be described as though it is a physical part of the boson sampler, but the skilled person would appreciate that in other implementations this need not be the case.

The unitary mapping transforms the input state into an output state that may be expressed as a superposition of the different possible configurations of the bosons in the output modes as $$|\Psi_{OUT}(\theta)\rangle = \sum_C a_C |n_1^{(C)}, n_2^{(C)}, \dots, n_M^{(C)}\rangle \quad \text{(EQ. 3)}$$

where C is a configuration, $n_j^{(C)}$ is the number of bosons in the $j^{th}$ output mode in configuration C, and $a_C$ is the probability amplitude associated with configuration C. By tuning the parameter values $\{\theta\}$, the probability amplitudes associated with each configuration may be changed. A measurement, using one or more boson number resolving detectors, of the number of bosons in each output mode yields a measurement outcome representable as a string of integers corresponding to a configuration C. By operating the boson sampler a plurality $N_S$ of times, it is possible to establish an empirical probability distribution of the bosonic configurations of the output state. One can expect that with many samples, the probability $p_C$ of obtaining a measurement outcome corresponding to configuration C is approximately given by $p_C = |a_C|^2$.

The use of a boson sampler to address binary optimization problems may seem counter-intuitive because measurement outcomes from boson samplers normally describe the number of bosons in each output mode of a boson sampler, which may not be a binary value. Bosons are not qubits and so one cannot encode an arbitrary qubit Hamiltonian like in other variational quantum-classical hybrid algorithms. Furthermore, the mechanism behind creating entangled states in linear bosonic circuits is quite different from the mechanism behind creating entangled states in qubit circuits because entanglement between modes in a linear bosonic circuit is very much related to boson statistics. The output multimodal bosonic state produced in a boson sampler is not typically considered a multiqubit state. The same holds for the Fock measurement (a measurement of the number of bosons in a mode)—it is quite dissimilar from a measurement in the qubit basis. For example, the user has little freedom as to the basis in which a measurement may be performed. Furthermore, boson sampling does not involve active error correction on the quantum device.

A quantum-classical hybrid process for identifying a binary sequence will now be described at a high level. An illustration of the process is provided in FIG. 1. The binary optimization task is to identify a binary sequence b of length L that optimizes an objective function F(b). The length of the binary sequence/number of binary variables L is less than or equal to the number M of input modes of an input multimodal bosonic state generated in a boson sampler. Measurement outcomes are produced by performing measurements on each of at least L of the M output modes of the output multimodal bosonic state. In particular, the measurement outcomes indicate whether one or more bosons were present in the L measured output modes (denoted with a tick in FIG. 1) or whether no bosons were present in the L measured output modes (denoted by a cross in FIG. 1). By using the presence or absence of bosons in each mode to determine the binary sequences, the full range of binary sequences of length L can be accessed even with shallow bosonic circuits, which means that fewer components can be used within the boson sampler, which in turn means that losses and therefore computational errors are greatly reduced.

Consider, as an example, that a binary sequence of length L=M is sought and that a measurement outcome from a boson sampler indicates the presence or absence of bosons in each of the M output modes. For example, the boson sampler may be a photonic boson sampler and the boson sampler may comprise one or more photon number resolving detectors capable of measuring the number of bosons in each output mode. Each measurement outcome in such circumstances may comprise a string of integers, each integer indicating the number of bosons found in a corresponding output mode. If one samples from the boson sampler $N_S$ times, then one may construct an empirical probability distribution of at most $N_S$ integer strings (measurement outcomes). That is, one may determine from the plurality of measurement outcomes that the empirical probability of measuring the output state (EQ. 3) in a specific configuration C with boson distribution $$\left( n_1^{(C)}, n_2^{(C)}, \ldots, n_M^{(C)} \right)$$

is $p_C$. One can expect that as the number of measurements taken, $N_S$, grows large, the probability $p_C$ of obtaining a particular integer string tends towards the square of the absolute value of the probability amplitude of the corresponding bosonic configuration $|a_C|^2$.

Measurement outcomes are then mappable to binary sequences of length L=M by evaluating whether or not each integer of an integer string is greater than zero (photons present) or is equal to zero (photons absent). There are two approaches to this. According to one approach, if photons were present in the measured mode, then the corresponding character of the binary sequence has a first value, while if photons were absent from the measured mode, then the corresponding character of the binary sequence has a second value. According to the alternative approach, if photons were present in the measured mode, then the corresponding character of the binary sequence has the second value, while if photons were absent from the measured mode, then the corresponding character of the binary sequence has the first value. Taking the first value and the second value to be 1 and 0 respectively, these two mappings can be described by:

$$\rho_0: b_k^{(0)} = \begin{cases} 1 & \text{if bosons detected} \\ 0 & \text{if bosons not detected} \end{cases} \quad \text{(EQ. 4)}$$

$$\rho_1: b_k^{(1)} = \begin{cases} 0 & \text{if bosons detected} \\ 1 & \text{if bosons not detected} \end{cases} \quad \text{(EQ. 5)}$$

According to the mapping of (EQ. 4), if the number of bosons in a particular output mode is greater than zero, then the corresponding binary digit is a 1, while if the number of bosons in that particular output mode is equal to zero, then the corresponding binary digit is 0. According to the mapping of (EQ. 5), if the number of bosons in a particular output mode is greater than zero, then the corresponding binary digit is a 0, while if the number of bosons in that particular output mode is equal to zero, then the corresponding binary digit is 1. Using either mapping, each measurement outcome $$\left( n_1^{(C)}, n_2^{(C)}, \ldots, n_M^{(C)} \right)$$

is mapped to a binary sequence $$b = \left( b_1^{(j)}, b_2^{(j)}, \ldots, b_M^{(j)} \right)$$

of a plurality of binary sequences (j is 0 or 1) wherein each element of a binary sequence corresponds to a measured output mode of the output multimodal bosonic state and has a value based on the presence or absence of bosons in that corresponding measured output mode. Multiple measurement outcomes may be mapped to the same binary sequence. For example, the integer strings (3,0,1,0) and (2,0,2,0) will lead to the same binary sequence. Accordingly, each binary sequence b has a corresponding weighting/probability Bb that corresponds to the sum of the empirical probabilities of all measurement outcomes that map to that binary sequence:

$$\beta_b = \sum_{\substack{C \text{ where} \\ \rho_j(C)=b}} p_C \quad \text{(EQ. 6)}$$

If the size of a candidate binary sequence L is smaller than the number of input modes M, then one may optionally measure only L of the output modes of the bosonic state or, alternatively, one may perform measurements on all M output modes and discard one or more elements of the corresponding measurement outcome.

A cost function/penalty function, denoted $E(\{\theta\})$, is defined based on the binary sequences to which one or more measurement outcomes map and the corresponding weightings of those binary sequences:

$$E(\{\theta\}) = \sum_b \beta_b F(b) \qquad \text{(EQ. 7)}$$

where $\{\theta\}$ represent a set of parameter values defining the parametrised transformation of the boson sampler, b represents a binary sequence mapped from at least one of the measurement outcomes obtained from the boson sampler when configured with that set of parameter values, and $\beta_b$ represents the weighting given to that binary sequence based on the (empirically derived) probabilities of all measurement outcomes that map to that that binary sequence.

The mapping of measurement outcomes to binary sequences can be performed by the classical computing resource used for implementing the hybrid process. Similarly, the weightings $\beta_b$ of the binary sequences can also be computed using the classical resource. Furthermore, the cost function (EQ. 7) can also be evaluated using the classical resource.

In order to home in on an optimal binary sequence for the binary optimization problem, the cost function (EQ. 7) is reduced (e.g., minimized) or increased (e.g., maximized) with respect to the parameter values defining the linear bosonic circuit. Any suitable method may be used for this, for example gradient descent or stochastic gradient descent. Once a stopping condition is satisfied, the boson sampler is operated using the finalised parameter values (i.e. the parameter values after no more iterations are performed), the output multimodal state is sampled and the measurement outcomes are mapped to binary sequences.

Roughly speaking, by iteratively reconfiguring the boson sampler to reduce (e.g., minimise) or increase (e.g., maximize) the cost function, the number of candidate solutions to the binary optimization problem is reduced from $2^L$ to a number more manageably computable on a classical processor (e.g., the total number of objective function evaluations may be polynomial on L instead of exponential on L). Due to the probabilistic nature of quantum mechanics, even after convergence multiple binary sequences may have a high weighting and the binary sequence that reduces (e.g., minimizes) or increases (e.g., maximizes) the objective function F(b) may or may not have the greatest weighting. Accordingly, a binary sequence is identified at least in part by evaluating the objective function for each of at least two binary sequences that are mapped to one or more measurement outcomes of the boson sampler operating with finalised parameter values.

Figure 2:
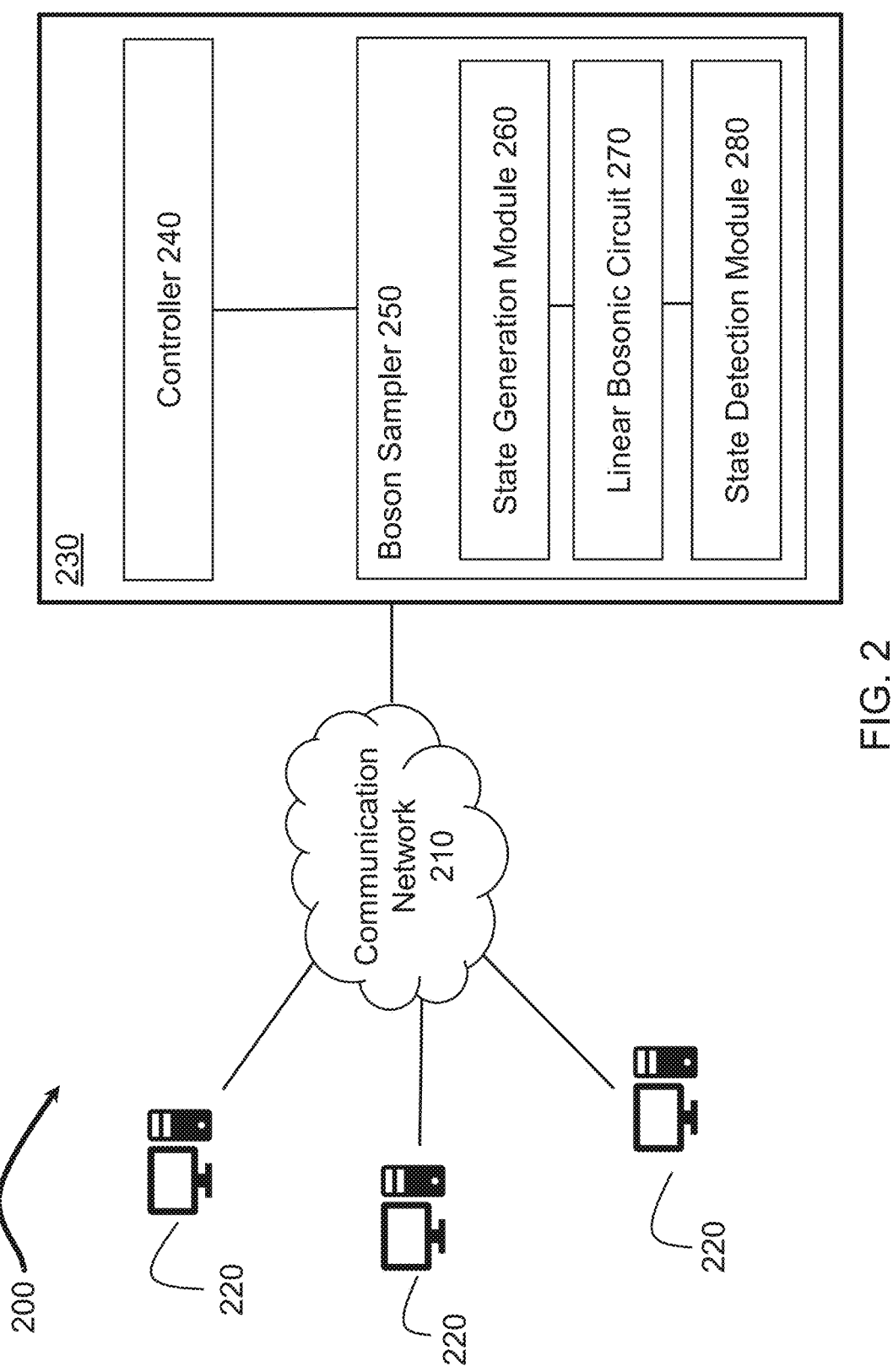
FIG. 2 shows a computing network including a heterogeneous computing system.

FIG. 2 depicts a computing network 200 in accordance with an illustrative example. The computing environment 200 comprises a communication network 210, one or more classical computing apparatuses 220, and a heterogeneous computing system 230. The computing network 200 shown in FIG. 2 is intended as an example only, as would be appreciated by the skilled person. For example, the computing network 200 may comprise more or fewer classical computing apparatuses 220.

The heterogeneous computing system 230 is configured to perform a quantum-classical hybrid algorithm in order to process a binary optimization task. In this example, the heterogeneous computing system 230 comprises a quantum computing resource in the form of a reconfigurable boson sampler/reconfigurable boson sampling device 250 and a classical computing resource in the form of a dedicated controller 240. The boson sampler 250 is configured to perform a boson sampling task (as will be described further below) and the controller is configured to perform classical subroutines of the quantum-classical hybrid algorithm (as will be described further below) and to control or coordinate the operation of the boson sampler 250. The skilled person will appreciate that other architectures for the heterogeneous computing system 230 are also suitable. For example, the heterogeneous computing system 230 may comprise a controller 240 and a plurality of boson samplers 250) thereby enabling parallel processing of a binary optimization task. In another example, the heterogeneous computing system 230 may comprise a plurality of boson samplers 250, each having a respective controller 240. Furthermore, while the controller 240 and boson sampler 250) are shown as co-located entities in FIG. 2, the skilled person would appreciate that this need not be the case—for example, the controller 240 and the boson sampler 250 may be spatially separated and communicate over a private or public communication network such as communication network 210.

The one or more classical computing apparatuses 220) and the heterogeneous computing system 230, or more particularly the controller 240 of the heterogeneous computing system 230, can communicate with each other over the communication network 210. The communication network 210 may be any known type of communication network enabling wired or wireless communication between computing apparatuses 220) and the controller 240, and could be for example a Local Area Network (LAN), a Wide Area Network (WAN), or the Internet.

A user of a computing apparatus 220 may submit a binary optimization task/problem to the heterogeneous computing system 230 over the communication network 210. The heterogeneous computing system 230 may then find a solution to the submitted binary optimization problem and return a solution to the computing apparatus 220. In particular, the controller 240 and boson sampler 250 may together execute a quantum-classical hybrid process to determine a solution to the binary optimization task by processing classical tasks on the controller 240 and quantum tasks on the boson sampler 250. A user may alternatively interact directly with the controller 240 in order to submit the binary optimization task. In some embodiments, a computing apparatus 220 includes the controller 240 and the controller 240 communicates with the boson sampler 250 via the communication network 210.

As used herein, "solution" may refer to a value that exactly minimizes (or maximizes) an objective function (e.g., a globally optimal solution). However, the term should not be limited to this definition. For example, a "solution" may refer to a value that reduces (or increases) an objective function relative to an initial value. In another example, a "solution" results in a local minimum or maximum of the objective function.

In some embodiments, the computing network 200 is a cloud computing system where boson computing is provided as a shared service to separate users. In a first example, a cloud computing service provider operates the boson sampler 250 and allows users to use the boson sampler 250. For example, a user using a computing apparatus 220, determines how to solve a binary optimization task/problem using a boson sampler, generates control instructions (e.g., parameter values) based on the determination, and transmits the control instructions to the computing system 230. In this example, the user's computing apparatus 220 may include the controller 240 or perform one or more of the controller 240 operations. In a second example, a cloud computing service provider receives a binary optimization task/problem from a user, determines how to solve the task/problem using a boson sampler, generates control instructions based on the determination, and transmits the control instructions to the computing system 230. In this example, the computing system 230 may be owned or operated by the service provider or another entity.

The boson sampler 250) is operable to prepare an input multimodal bosonic state, to perform a parametrised unitary transformation of the input multimodal bosonic state to an output multimodal bosonic state comprising a plurality of output modes, and to perform measurements on output modes of the output multimodal bosonic state to produce measurement outcomes, each measurement outcome based on the number of photons in measured output modes of the multimodal output bosonic state.

The boson sampler 250 comprises a state generation module 260, a reconfigurable linear bosonic circuit 270, and a state detection module 280. In the example shown in FIG. 2, the linear bosonic circuit 270 is a physical module comprised within the boson sampler 250.

For example, the linear bosonic circuit 270) may comprise a linear interferometer of a photonic boson sampler. However, the skilled person will appreciate that this need not be the case—as discussed above, depending on the nature of the bosonic system used, the linear bosonic circuit 270 may instead be implemented as a sequence of control signals applied by a controller 240 to the input bosonic multimodal state.

The state generation module 250 is configured to generate an input multimodal bosonic state. The input multimodal bosonic state is a product state comprising a plurality of N bosons distributed across a plurality of M input modes. The number M of input modes is greater than or equal to the size L of candidate binary solutions to a binary optimization problem.

The reconfigurable linear bosonic circuit 270 is configured to receive the input multimodal bosonic state, to transform the input multimodal bosonic state to an output multimodal state, and to output the output multimodal bosonic state to the state detection module 280. The transformation is dependent on the values $\{\theta\}$ of a set of parameters $\theta$.

The state detection module 280 is configured to measure output modes of the output multimodal bosonic state to produce a measurement outcome indicating whether or not bosons were present in each measured output mode. For example, in a photonic boson sampler, the state detection module 280 may comprise one or more photon number resolving (PNR) detectors, and/or one or more threshold detectors.

The boson sampler 250 of the heterogeneous computing system 230 may take any suitable form and several compatible non-limiting examples will be described further below with reference to FIGS. 3A-3H.

The controller 240 may be any suitable classical computing resource for performing classical processing tasks and for controlling the operation of the boson sampler 250. In an example, the controller 240 may comprise a single computing device such as a server. In another example, the controller 240) may comprise a collection or cluster of interconnected computing devices which are collectively configured to perform classical processing tasks and control the boson sampler 250. Classical processing tasks may be divided between the interconnected computing devices which may communicate with each other over a physical network, a peer-to-peer network, or a public communication network such as communication network 210.

The controller 240 is configured to receive a submitted binary optimization task. The binary optimization task may be received from a computing apparatus 220 over the communication network 210 or may be received directly from a user interacting with the controller 240). The controller 240 is further configured to coordinate the processing of a quantum-classical hybrid algorithm between the controller 240) as a classical resource and the boson sampler 250. The controller 240 is further configured to communicate to the submitting user a determined solution to the binary optimization problem.

The controller 240 is arranged to configure the boson sampler 250. In particular, during the processing of a quantum-classical hybrid algorithm, the controller 240 is configured to determine sets of parameter values $\{\theta\}$ to which the parameters $\theta$ of the linear bosonic circuit 270) are to be tuned. The controller 240 is able to configure the linear bosonic circuit 270) according to a set of parameter values $\{\theta\}$ and thereby to control the transformation of the input multimodal bosonic state that is implemented by the linear bosonic circuit 270. For example, the controller 240 may directly send control signals that tune the reflectivity/transmittance of a reconfigurable beam splitter or the phase imparted by a phase shifter.

The controller 240 is further able to cause the boson sampler 250 to operate a plurality $N_S$ of times such that the output distribution of the boson sampler 250 can be sampled. For example, the controller 240 may generate one or more control signals to cause the boson sampler to generate an input multimodal bosonic state. For example, with a photonic boson sampler in which the state generation module comprises a plurality of single photon sources, the controller may generate one or more control signals to control which single photon sources generate a single photon and when.

The controller 240 may optionally be able to control which input multimodal bosonic state is input into the boson sampler, for example by generating one or more control signals to control the number of bosons in each input mode. For example, in a photonic boson sampler in which the state generation module comprises a plurality of single photon sources, the controller may be able to generate one or more control signals to cause a selected number of photons to be emitted at a particular time point.

After a boson sampler is operated a number of times, measurement outcomes may be aggregated together to form a response. A response may be representative of an empirical probability distribution of the measurement outcomes. The controller 240 is further configured to receive a response from the boson sampler 250. The response may be received in any form. According to some examples, the response may comprise a list of $N_S$ measurement outcomes achieved from operating the boson sampler a plurality $N_S$ of times and taking corresponding measurements. According to other examples, the response may comprise a list of distinct measurement outcomes and their corresponding (empirically derived) probabilities.

The controller 240 is further configured to perform classical processing tasks including analysing the response from the boson sampler 250, mapping distinct measurement outcomes to binary sequences, mapping empirically derived probabilities to weightings of binary sequences, determining cost function values and/or objective function values and determining updates to parameter values.

Figure 3A:
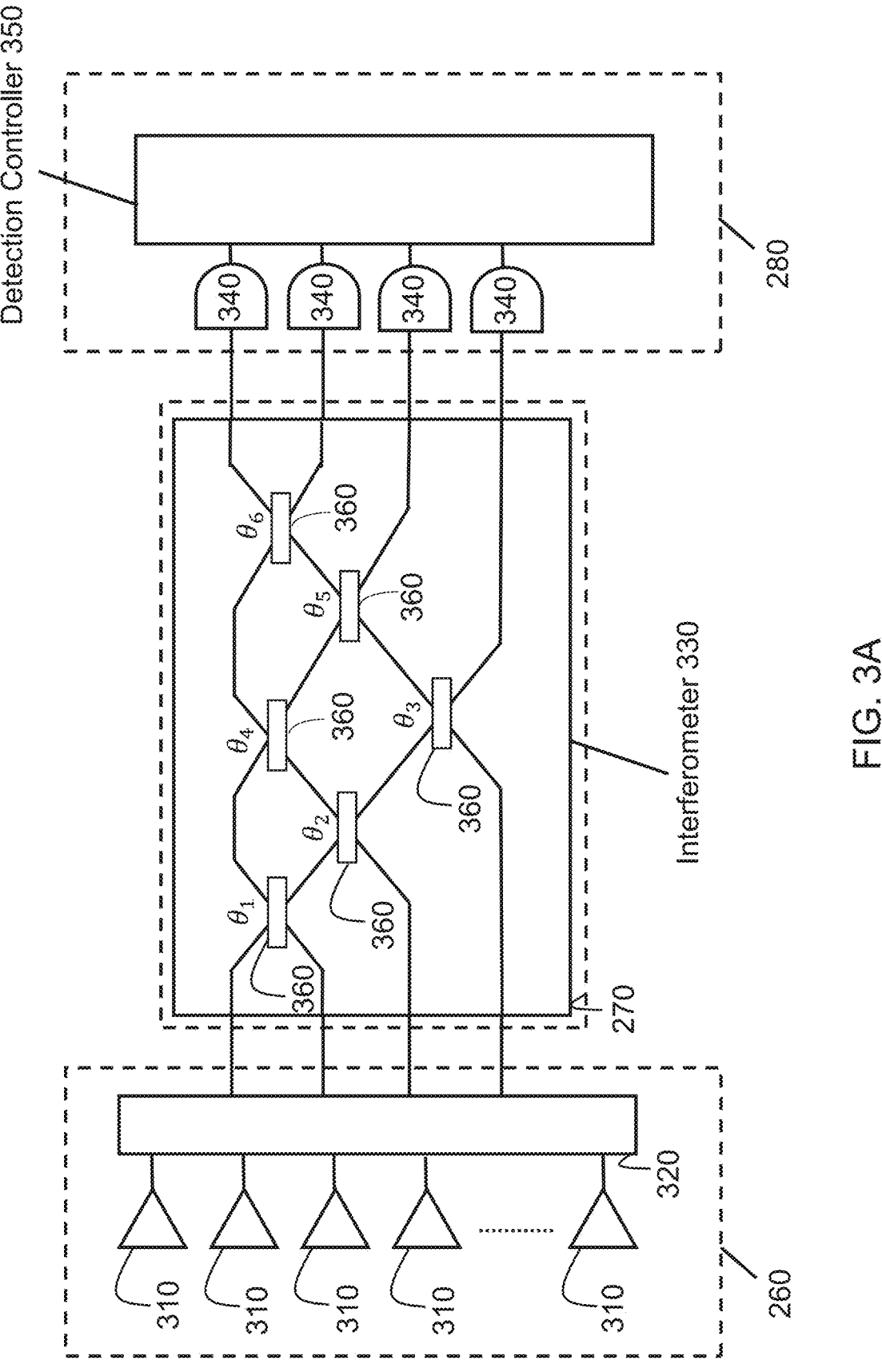
FIG. 3A shows an illustration of a first example of a boson sampler that may be comprised in a heterogeneous computing system.

FIG. 3A illustrates a first example of a boson sampler 250, in particular a photonic boson sampler, with which the quantum-classical hybrid algorithms described herein may be implemented. In the photonic boson sampler of FIG. 3A, the modes of the input multimodal bosonic state are spatial modes—that is, the state is defined by the number of bosons in each of a plurality of spatially separated paths.

The state generation module 260 of FIG. 3A comprises a plurality of single photon sources 310 configured to produce single photons. One suitable photon source technology is spontaneous parametric down-conversion (SPDC). In SPDC, a non-linear crystal is pumped with a laser and, probabilistically, entangled photons are emitted (the "signal" and the "idler"). A detector (not shown in FIG. 3A) is arranged to detect the presence of the signal which, due to the entanglement, heralds the presence of a photon in the idler mode. Other photon sources may also be used, for example solid state photon sources.

The number of single photon sources may be greater than the number M of input modes of the input multimodal bosonic state |Ψ$_{IN}$⟩ in order to account for the fact that single photons may be generated only probabilistically. The state generation module 260 of FIG. 3A comprises a multiplexer 320 to route successfully generated single photons to N input ports of the M input ports of the linear bosonic circuit 270. In the example shown in FIG. 3A, the number of single photons N is equal to the number of input modes M of the linear bosonic circuit 270.

In FIG. 3A, the linear bosonic circuit comprises a linear photonic network. More particularly, the linear bosonic circuit comprises an interferometer 330. The interferometer 330 comprises M input ports. M output ports, and a plurality of waveguides arranged to pass through the interferometer 330 to connect the M input ports to the M output ports. The plurality of waveguides are arranged to provide a plurality of coupling locations between pairs of the plurality of waveguides. A reconfigurable beam splitter 360 is arranged at each of the coupling locations such that at each coupling location the two modes of electromagnetic radiation carried by the two respective waveguides are capable of coupling with each other with a reconfigurable reflection coefficient (transmission coefficient). The reflection (transmission) coefficient of each reconfigurable beam splitter is denoted with a theta in the figure.

A parametrised/reconfigurable beam splitter is understood to mean any tuneable device or tuneable collection of devices capable of coupling two modes of electromagnetic radiation with each other with a reconfigurable reflection/transmission coefficient and optionally a reconfigurable phase shift coefficient (not indicated in FIG. 3A). The parametrised beam splitters may be implemented in any suitable way—for example a parametrised beam splitter may comprise a Mach-Zehnder type interferometer containing a variable phase shifter in one internal path for controlling the effective beam splitter reflection coefficient of the Mach-Zehnder interferometer. The Mach-Zehnder interferometer may further comprise an external phase shifter on one external path of the Mach-Zehnder interferometer to control the relative phases of the two modes acted upon.

The interferometer 330 may further comprise mirrors and other passive photonic elements (not shown). Accordingly, the interferometer 330 routes the single photons received at the M input ports to the plurality of M output ports based on operations defined by a set of parameter values.

The linear bosonic circuit 270 of FIG. 3A is suitable for transforming an input multimodal bosonic state comprising M input spatial modes to an output multimodal bosonic state comprising M output spatial modes. This skilled person will appreciate that other architectures for the linear bosonic circuit 270 may be utilised. Of course, while in the illustration the number of input and output modes is M=4, a linear bosonic circuit 270 may be provided to operate on a greater or lesser number of modes.

The state detection module 280 comprises a plurality of detectors 340 for detecting the presence or absence of photons, each arranged to receive any photons output from a corresponding output port of the interferometer 330. The detectors may comprise photon number resolving (PNR) detectors, for example superconducting nanowire photon detectors.

The detectors may comprise threshold detectors, for example an avalanche photodiode detector. A detection controller 350 receives signals from the plurality of detectors 340 and can accordingly determine whether photons were detected by each detector. The state detection module 280 comprises one detector for each of the M output modes and accordingly the measurement outcomes are indicate whether photons were detected in all output modes of the output multimodal bosonic state. The skilled person would appreciate that for a binary optimization problem in which one seeks to find a binary sequence having a length L less than the number of modes M, the measurement outcomes of some of the detectors may be discarded.

Referring in particular to the arrangement of the waveguides and coupling locations in the interferometer 330 of FIG. 3A, it is notable that there is a path through the interferometer 330 from each of the input ports to each of the output ports, such that a photon in any of the input modes of the input multimodal bosonic state can appear in any output mode of the output multimodal bosonic state. The interferometer 330 of FIG. 3A receives as input an input multimodal bosonic state having four input modes (M=4). The coupling locations of the waveguides at which six parametrised beam splitters 360 are located corresponds (up to single mode phase shifts) to the Reck decomposition (M. Reck et al., "Experimental realization of any discrete unitary operator". Phys. Rev. Lett., volume 73, page 58, 1994) of any unitary transformation of four modes. That is, with reconfigurable phase shifters (single mode operations), the triangular arrangement of reconfigurable beam splitters (multimodal operations) depicted in FIG. 3A can, with suitable beam splitter coefficients and phase coefficients, be used to implement any unitary transformation of an input state comprising four spatial modes to an output state comprising four spatial modes. As there are paths through the interferometer 330 such that a photon in any input port can be routed to any output port with a suitable choice of parameter values, the specific interferometer 330 of FIG. 3A can be described as a full-depth interferometer and the boson sampler can be described as a "full-depth" boson sampler. Furthermore, every input mode interacts with every other input mode within the interferometer 330.

The triangular arrangement of coupling locations in the Reck decomposition may be used in universal multiport interferometers. For a universal M-port interferometer. M(M−1)/2 multimodal operations (e.g. reconfigurable beam splitters) are required. Other full-depth arrangements are also possible, for example a rectangular decomposition.

Figure 3B:
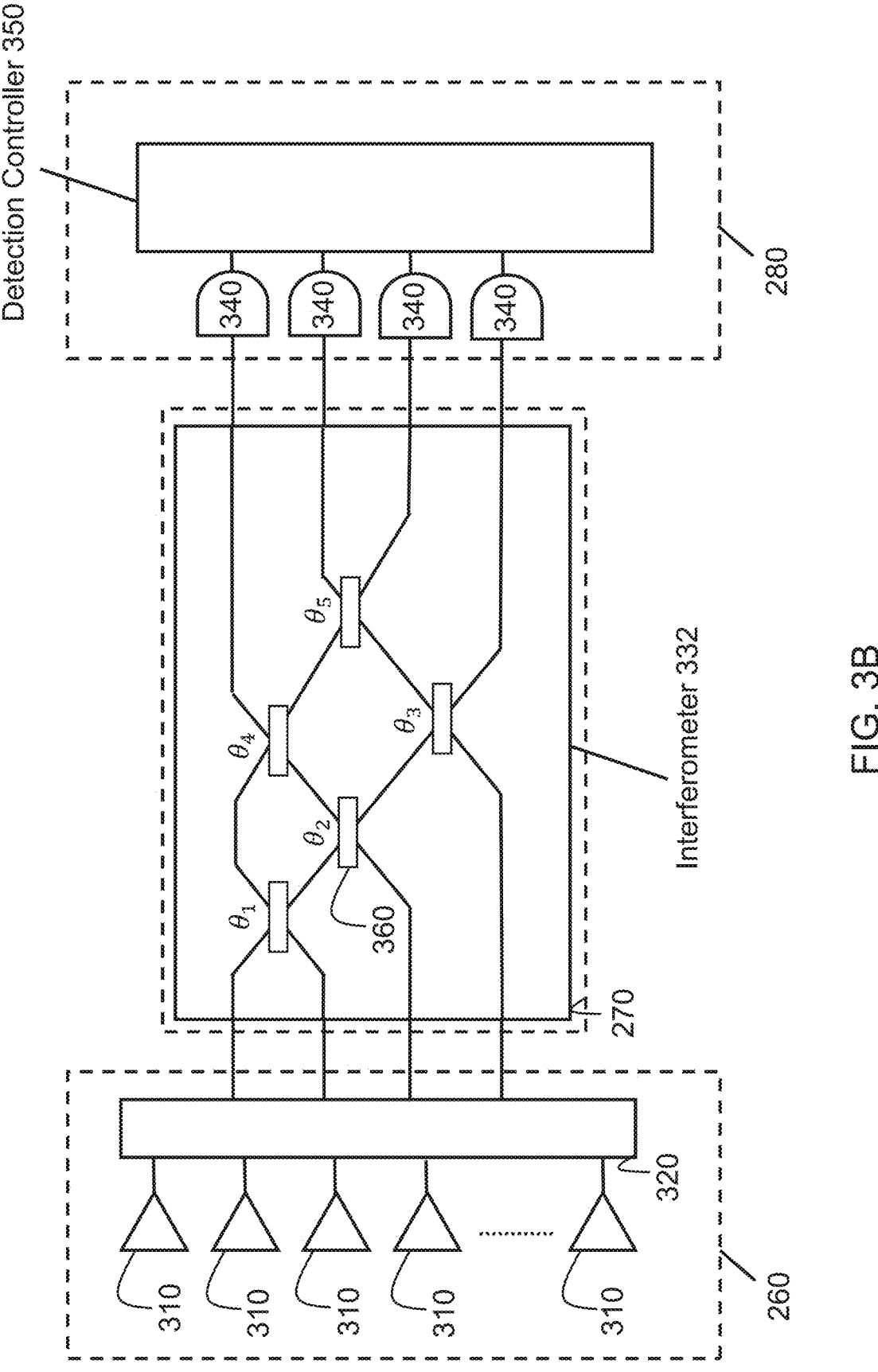
FIG. 3B shows a second example of a boson sampler that may be comprised in a heterogeneous computing system.

FIG. 3B illustrates a second example of a boson sampler 250, in particular a photonic boson sampler, with which the quantum-classical hybrid algorithms described herein may be implemented. The boson sampler is similar to that depicted in FIG. 3A except that the interferometer 332 of FIG. 3B has fewer optical components than the interferometer 330 of FIG. 3A. In particular, the interferometer 332 of FIG. 3B comprises five parametrised beam splitters. The arrangement of waveguides and parametrised beam splitters in the interferometer 332 of FIG. 3B is similar to the first two diagonal "slices" of the triangular Reck arrangement of interferometer 330. The interferometer 332 has fewer crossing points than the M(M−1)/2 coupling locations and reconfigurable beam splitters used for a universal interferometer. As can be seen from the figure, there is no route through the interferometer 332 for photons that enter the interferometer 332 through the bottom input port to be routed to the topmost output port, and accordingly the interferometer 332 may be described as a "shallow" (i.e. not full-depth) linear bosonic circuit. The plurality of coupling locations are arranged such that at least one of the M input modes couples with each of the other M−1 modes in the interferometer.

Figure 3C:
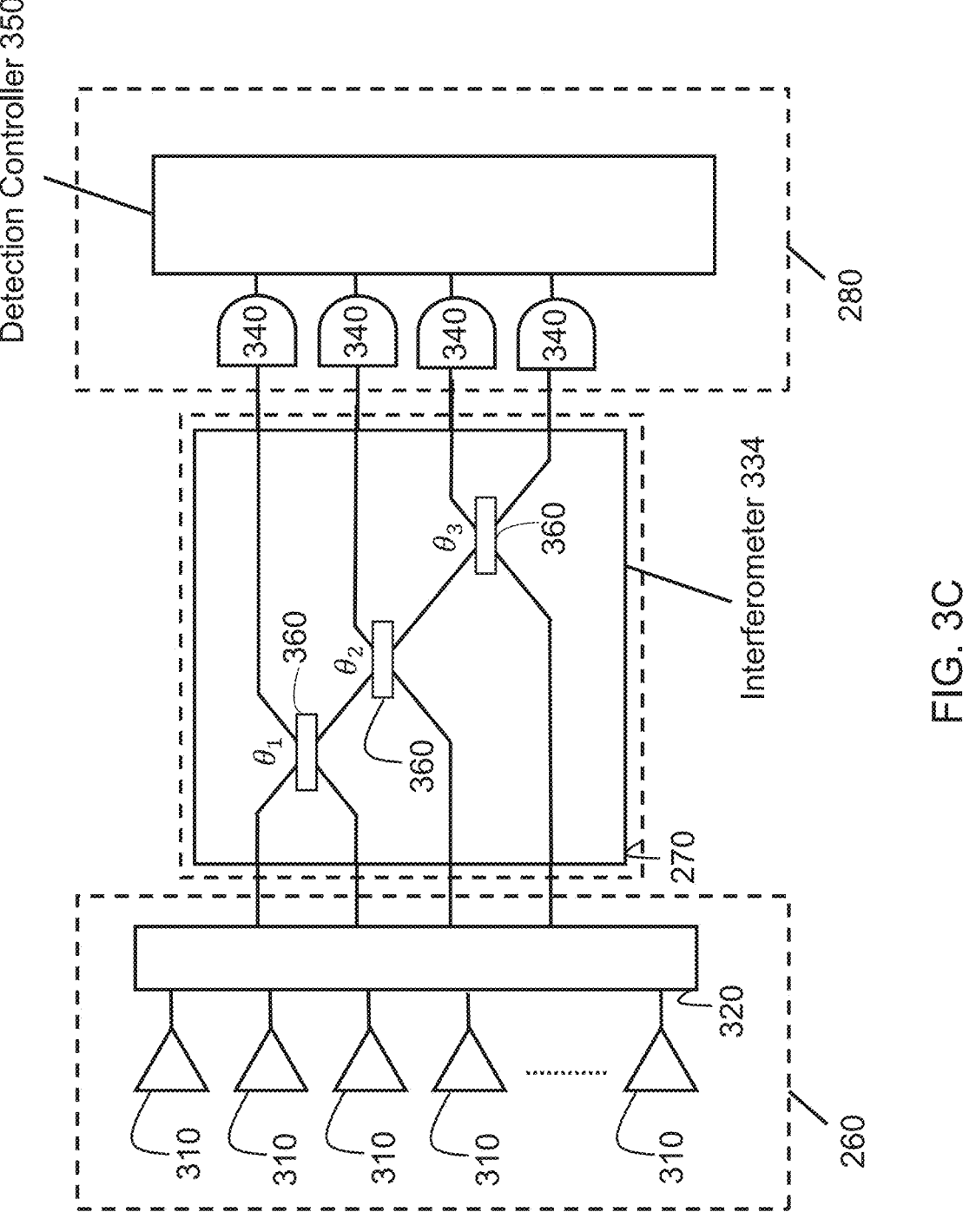
FIG. 3C shows a third example of a boson sampler that may be comprised in a heterogeneous computing system.

FIG. 3C illustrates a third example of a boson sampler 250, in particular a photonic boson sampler, with which the quantum-classical hybrid algorithms described herein may be implemented. The boson sampler is similar to that depicted in FIG. 3B except that the interferometer 334 of FIG. 3C has fewer optical components than the interferometer 332 of FIG. 3B. In particular, the interferometer 334 comprises three coupling locations having reconfigurable beam splitters. The arrangement of waveguides and parametrised beam splitters in interferometer 334 is similar to the first slice of the triangular Reck arrangement for an arbitrary unitary operation on four modes. As can be seen from the figure, there is no route through the interferometer for photons that enter the interferometer through either of the bottom two input ports to the topmost output port, and accordingly the interferometer 334 is a shallow interferometer. The plurality of coupling locations are arranged such that at least one of the M input modes couples with each of the other M−1 modes in the interferometer.

The skilled person will appreciate that the interferometers 330, 332, 334 may comprise any arrangement of beam splitters, phase shifters, and other passive photonic elements, and that the illustrations shown in FIG. 3A to FIG. 3C are not in any way intended to be limiting.

Figure 3D:
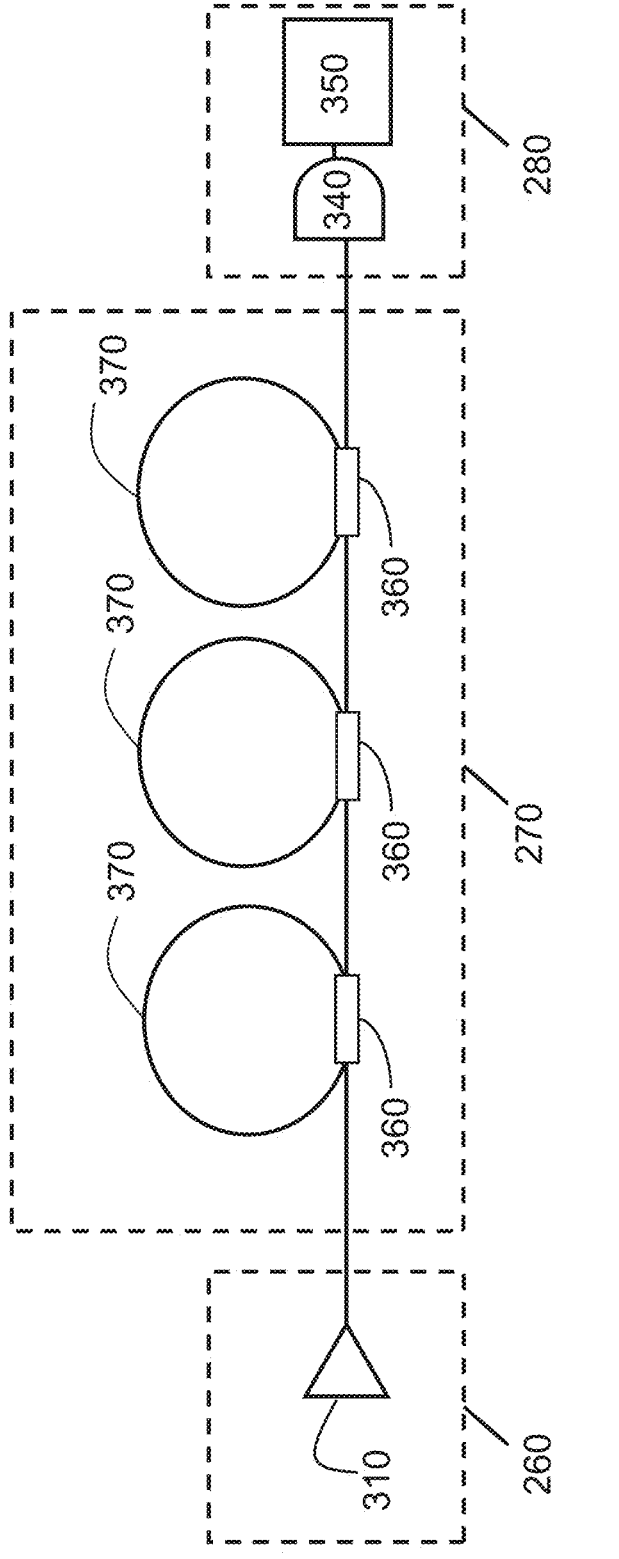
FIG. 3D shows a fourth example of a boson sampler that may be comprised in a heterogeneous computing system.

FIG. 3D illustrates a fourth example of a boson sampler 250, in particular a photonic boson sampler, with which the quantum-classical hybrid algorithms described herein may be implemented. In the photonic boson sampler of FIG. 3D, the modes of the input multimodal bosonic state are temporal modes. That is, the state is defined by the number of bosons in each of a plurality of temporal modes or time bins.

The state generation module 260 of FIG. 3D comprises a single photon source 310 configured to produce a single photon in each of a plurality of time bins, so that each photon enters the linear bosonic circuit 270, a time-bin interferometer, separated from the next by a time T. As in the boson sampler of FIG. 3A, the state generation module 260 may comprise further single photon sources 310 and a multiplexer 320 in order to reliably ensure that a single photon is generated in each time period T.

The linear bosonic circuit 270 comprises a plurality of temporal mode coupling devices. In particular, in FIG. 3D, a temporal mode coupling device comprises a reconfigurable beam splitter 360 and a delay line 370. A delay line is arranged to connect one input port of the reconfigurable beam splitter 360 with one output port of the reconfigurable beam splitter 360. Each delay line 370 may comprise, for example, optical fibre. Each delay line 370 may have a length cτ where c is the speed of light in the fibre. In this way, photons in one temporal mode may be routed so as to interfere with photons in the next temporal mode on a parametrised beam splitter 360. The time-bin interferometer may comprise further optical components including further optical switches.

The parameter value (e.g. transmittance) of each parametrised beam splitter 360 can be selectively tuned by a controller 240 for each time interval. Accordingly, each temporal mode coupling device can be used to implement a diagonal slice of the Reck decomposition. For example, for four input modes, the first temporal mode coupling device can be used to implement the equivalent operations of the three beam splitters defined by parameters $\theta_1$, $\theta_2$ and $\theta_3$ shown in FIG. 3A. The second temporal mode coupling device can be used to implement the equivalent operations of the two beam splitters defined by parameters $\theta_4$ and $\theta_5$ shown in FIG. 3A. The third temporal mode coupling device can be used to implement the equivalent operation of the beam splitter having parameter $\theta_6$ in FIG. 3A. That is, the time bin interferometer shown in FIG. 3D can be used to implement a full-depth circuit for four temporal modes. In general, with M−1 delay lines and corresponding beam splitters, a time bin interferometer can implement the full-depth Reck decomposition circuit for an M mode unitary operation.

The state detection module 280 comprises a photon detector capable of determining the presence or absence of photons in each temporal mode and a detection controller arranged to determine the measurement outcome.

Figure 3E:
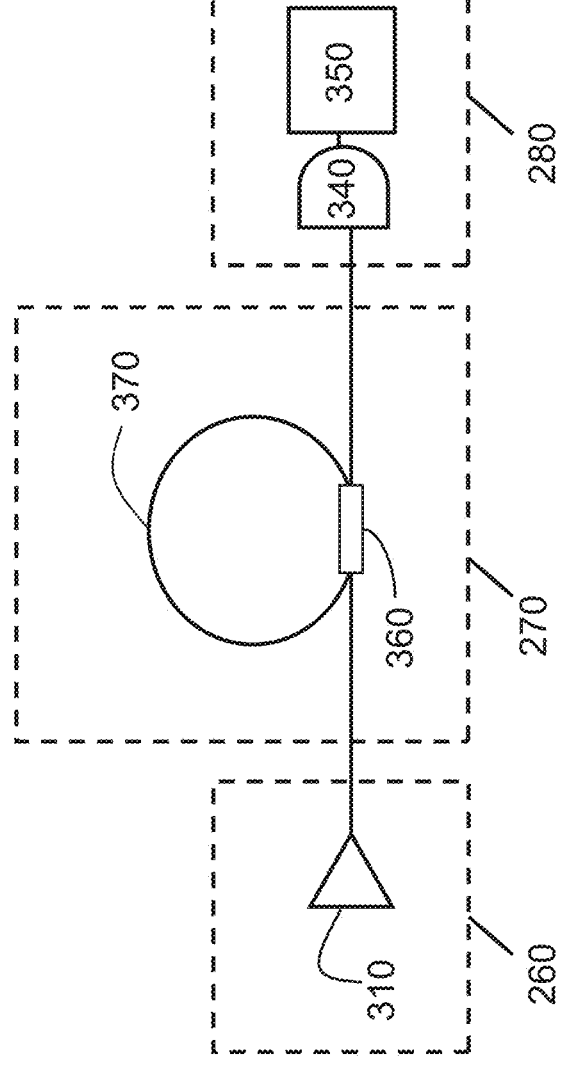
FIG. 3E shows a fifth example of a boson sampler that may be comprised in a heterogeneous computing system.

FIG. 3E depicts a fifth example of a boson sampler, in particular a photonic boson sampler, with which the quantum-classical hybrid algorithms described herein may be implemented. The boson sampler depicted in FIG. 3E is similar to that shown in FIG. 3D except that the time-bin interferometer comprises a single temporal mode coupling device. As discussed above, with a single temporal mode coupling device the equivalent operations of the three beam splitters defined by parameters $\theta_1$, $\theta_2$ and $\theta_3$ shown in FIG. 3A can be implemented. Indeed, the first slice of the Reck decomposition for an M mode transformation can be implemented.

Figure 3F:
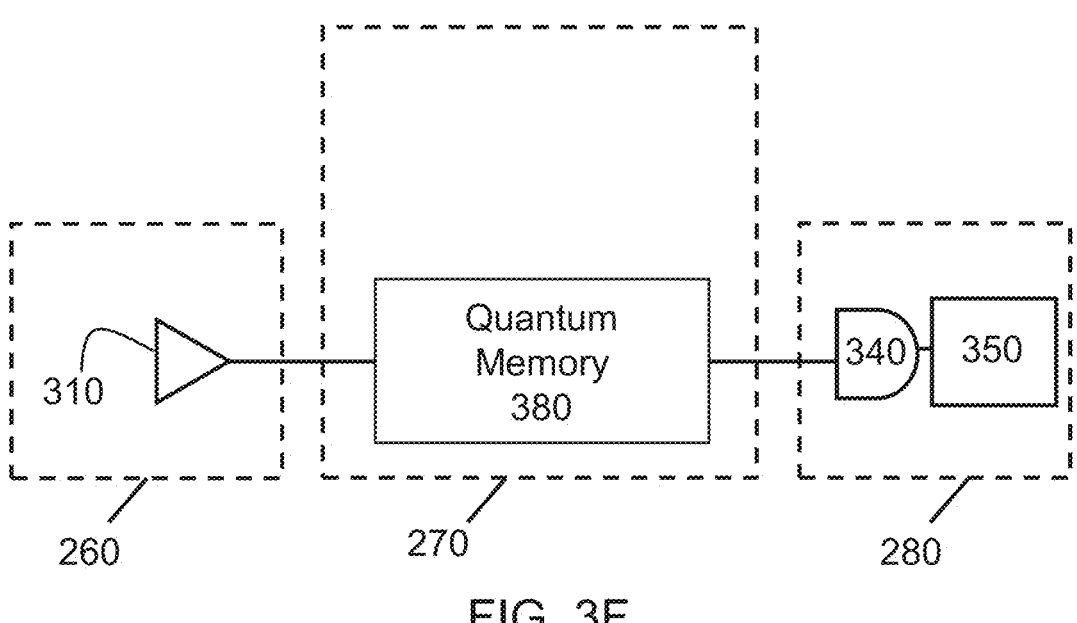
FIG. 3F shows a sixth example of a boson sampler that may be comprised in a heterogeneous computing system.

FIG. 3F illustrates a sixth example of a boson sampler, in particular a photonic boson sampler, with which the quantum-classical hybrid algorithms described herein may be implemented. The boson sampler depicted in FIG. 3F is similar to that shown in FIG. 3E except that the single temporal mode coupling device of FIG. 3F comprises a quantum memory device 380. The quantum memory device 380 may be used to controllably place, for example, a photon in the first temporal mode into a superposition of being stored in the memory and being not stored in the memory, and then to controllably release any photon (or quantum state thereof) stored in the memory at the time the second temporal mode passes through, in order to interfere temporal modes in a similar way as a reconfigurable beam splitter can be used to interfere modes. A quantum memory is further described with respect to FIGS. 3G-3H. Additionally, an example of a suitable quantum memory device being used in such a way is described in international patent application number PCT/GB2021/052447 filed on 21 Sep. 2021 in the name of ORCA Computing Limited, the content of which is incorporated herein by reference.

Figure 3G:
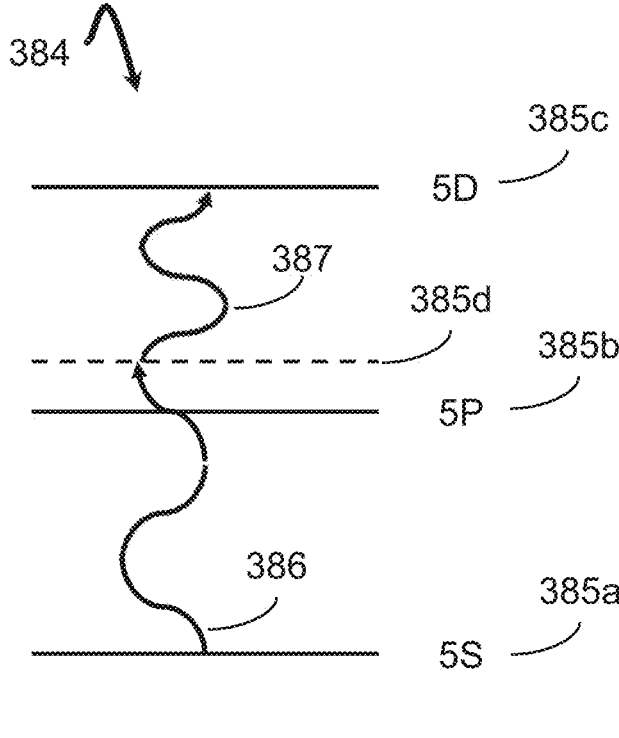
FIG. 3G shows example energy levels of an atomic system.

According to an example, a quantum memory device 380 may comprise an atomic system 384 having discrete energy states (385a, 385b, 385c), which may be termed 'energy levels'. The atomic system may comprise a single type of neutral atoms or ions or a plurality of different types of neutral atoms and/or ions. The atomic system may be an atomic ensemble comprising a plurality of atoms, such as a gas of atoms, or ions, such as a rare earth ion locked in a host medium. Such an atomic system may use energy levels associated with electrons in inner or outer shells of atoms, ions, or crystal defects. Examples of suitable atomic ensembles include vapours containing Rubidium. Other energy levels of atomic system may be used including Rydberg-type atomic systems. Additionally, or alternatively the atomic system may comprise a single neutral atom or ion, for example single 87Rb atoms in a magneto-optical-trap (MOT). The atomic system 384 of FIG. 3G is an example of a ladder-based energy system wherein the energy states of the atomic system are energy levels of valence electrons of an atomic ensemble. The discrete energy states have a first energy state (385a), a second energy state (385b) and a third energy state 385c. The third energy state 385c has a higher energy than the second energy state 385b. The second energy state 385b has a higher energy than the first energy state 385c. In the example of FIG. 3G, the first energy state 385a of the atomic system is the 5S energy level, the second energy state 385b is the 5P energy level and the third energy state 385c is the 5D energy level, however other energy levels and atomic systems may be used.

The quantum memory device 380 may be configured to receive first electromagnetic radiation comprising at least one photon (386), the photon having a field and a first frequency; the first frequency associated with a first energy. That is, the photon of a temporal mode of the input multi-modal bosonic state is received as first electromagnetic radiation (386) by the quantum memory device 380. The quantum memory device 380 may be further configured to receive second electromagnetic radiation (387), the second electromagnetic radiation having a second frequency. The second frequency may correspond to a second energy such that the sum of the first energy and the second energy corresponds to a resonance between the first energy state 385a and the third energy state 385b. The second energy may be different to the energy difference between the first energy state 385a and second energy state 385b of the atomic system 384. The second energy may be different to the energy difference between the second energy state 385b and third energy state 385c of the atomic system 384.

The quantum memory device 380 may be further configured to use the second electromagnetic radiation 387 to cause the photon of the temporal mode to have at least a portion of its field stored in the atomic system 384 by one or more electrons transitioning between the first energy state 385a and third energy state 385c. The quantum memory device may be further configured to receive third electromagnetic radiation (not shown), the third electromagnetic radiation having a third frequency. The third frequency may correspond to a third energy. The third energy may be less than the energy difference between the first energy state 385a and the third energy state 385c. The third energy may be different to the energy difference between the first energy state 385a and the second energy state 385b of the atomic system 384. The third energy may be different to the energy difference between the second energy state 385b and third energy state 385c of the atomic system 384. The quantum memory device 380 may be further configured to use the third electromagnetic radiation to cause at least a part of the stored field portion to be emitted from the atomic system 384.

The quantum memory device 380 may therefore be used to store photons from the first electromagnetic (EM) radiation 386 either in a deterministic manner or in a superposition state, the superposition state of a photon having components of both being stored and not stored. This is accomplished using a two (or more) photon resonance transition between the first and third energy states (385a. 385c) of the atomic system 384 wherein, individually, the first energy and the second energy correspond to off-resonant transitions of the atomic system 384. The target photon to be stored in the system may be termed the signal photon or 'signal' whilst the EM radiation used to controllably store or emit the signal photon may be referred to as the control pulse, or suitably "read-in" or 'read-out' pulses. To store at least a portion of the first EM radiation 386 in the atomic system 384, the first and second EM radiation temporally overlap in the atomic system. As well as the photon from the first EM radiation being stored, a photon from the second EM radiation is also stored via the two-photon resonance.

Neither of the photon energies of the first and second electromagnetic radiation (386, 387) correspond to the atomic transitions between the first and second energy levels (385a. 385b) or between the second and third energy levels (385b. 385c). Instead, the frequencies correspond to off resonant transitions such that the photon from the first radiation corresponds to a transition from the first level 5S to an off-resonance level 385d above the 5P level. Similarly, a photon from the second EM radiation 387 corresponds to a transition from the off-resonance level 385d to the third level 5D 385c. This example is not limited to such an off-resonance level.

The off-resonance level may be above or below the second energy state 5P. Either of the transitions between a) the first energy level 385a and the off-resonance level 385d; and, b) the off resonance level 385d and the third energy level 385c, may correspond to the frequencies of any of the first, second and third radiation provided the overall resonance condition applies, which in this example is a two-photon resonance condition. The operation to store or release a photon from the atomic system may in principle involve two or more photons each from one or more sources of EM radiation. Furthermore, in this example the frequencies of the first and second EM radiation are different, however they may be the same.

Upon receiving the third EM radiation, the atomic system is stimulated to emit the stored photon to be further stored by a further photon storage function in the apparatus. Upon emitting the photon of the first EM radiation, the photon of the second EM radiation used in the two-photon resonance is also emitted.

Typically, the second and third electromagnetic radiation are pulses of EM radiation, however continuous wave (CW) operation is also feasible. The first EM radiation is a single photon of a single temporal mode of the input multimodal bosonic state. The single photon may also be part of a train of single photons temporally separated into different time bins i.e. each of the temporal modes of the input state in turn. The frequencies of the first and third EM radiation in this example are different, however they may be the same. In this example, the frequencies of the second and third EM radiation are the same. In such a case the sum of the first energy and third energy corresponds to a resonance between the third and first energy states of the atomic system. Alternatively, the second and third EM radiation frequencies (hence energies) may be different. Where the frequencies of the second and third radiation are different, the stored photon of the first EM radiation is output at a different frequency to its first frequency when it was initially input to the atomic system.

As described above, the stored photon may be deterministically stored or non-deterministically stored. This typically depends primarily on the photon flux of the second EM radiation. The higher the number of photons in the second EM signal, the greater the probability that the photon of the first EM signal is stored. The number of photons in the second and third signal affecting the storage, transmission or release of a photon may be referred to as the photon flux (the number of photons per second) of the incident EM radiation.

In circumstances where the second EM radiation has a photon flux that may either store the first EM photon or allow the first EM photon to be transmitted through the atomic system, the photon has field components in both of these states and therefore is in a quantum superposition until the superposition state collapses, for example by being measured by a detector.

When the third EM pulse is incident upon the atomic system, after the first EM pulse, the portion of the photon field being stored by the atomic system may be emitted or may remain stored. The third EM radiation may comprise a photon flux such that the field portion stored in the atomic ensemble is in a superposition of: a) being stored by the atomic ensemble; and, b) being emitted by the atomic ensemble. Thus, similar to the second EM pulse, the third EM pulse may have a photon flux that either deterministically outputs the stored portion of the photon field or places that stored portion in a quantum superposition of being continually stored in the atomic system 384 or emitted from the atomic system 384.

Figure 3H:
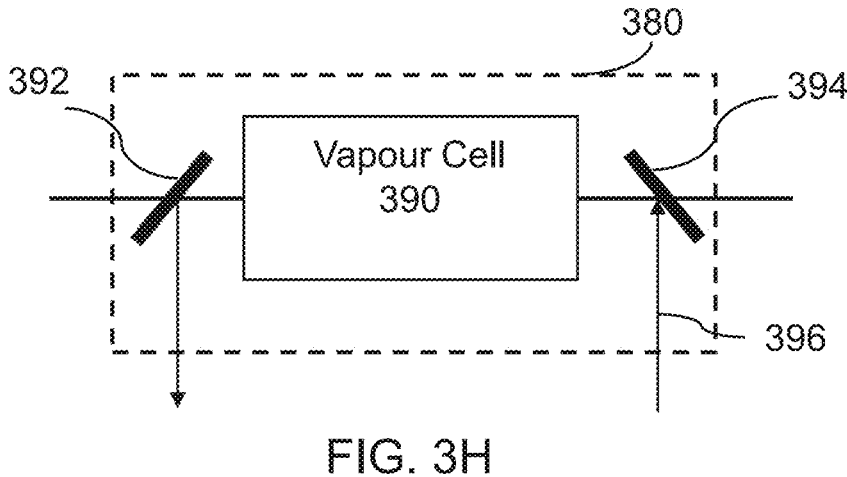
FIG. 3H shows an example quantum memory device.

FIG. 3H shows an example implementation of a quantum memory device 380. The apparatus of FIG. 3H is set up using bulk optics, in particular the mirrors 392, 394, and other equipment used to generate the control pulses, however portions may be implemented using optical fibre or integrated optics. Single photons pass through a dichroic mirror 392 to enter a vapour cell 390 holding an atomic ensemble 384 with the ladder-like energy level structure of FIG. 3G. In particular, the vapour may be a rubidium vapour. A further dichroic mirror 394 is disposed the other side of the vapour cell 390 such that photons may pass through the vapour cell 390 from one mirror 392 to the other 394. A strong control field 396 enters counterpropagating through the vapour cell 390, via reflection off the dichroic mirror 394 to provide the second EM radiation referred to above in relation to FIG. 3G. The counter propagating nature of the control field 396 enables phase matching conditions to be achieved. The first and second dichroic mirrors 392, 394 are transmissive to signal source wavelengths but reflective to control pulse wavelengths.

The control field 396 is generated using a source (not shown) of pulsed electromagnetic radiation at the correct optical frequency and wavelength, which for a rubidium vapour cell as used in this example is 776 nm. This source may be a mode-locked titanium sapphire laser or a CW External Cavity Diode Laser followed by a Tapered Amplifier and an intensity modulator for pulse carving, for example a Pockel's cell and/or acousto-optic modulator. Alternatively, this could be another source of pulsed electromagnetic radiation at the correct optical frequency and wavelength. The timing of the pulse generation is optimised so that the final control field pulse 396 is overlapped temporally with the target time bin in the vapour cell 390 and is ultimately selected by control electronics (not shown in the figure). When the control field 396 is temporally overlapped in the vapour cell 390 with the target time-bin, the signal photons in the time-bin are read-in and stored.

To perform a unitary operation on the time-bins of interest, which can be selected arbitrarily, a second control pulse generated from the laser and equipment (not shown) is generated, following the first control pulse, at a time such that it will temporally overlap with a further time-bin of interest in the vapour cell 390. The control electronics sets the photon flux of the second control pulse to perform the effective beam splitter operation required, for example as requested by the user or as determined from feedback from a detector. This couples the further time-bin with the time-bin previously stored in vapour cell 390 with a strength according to the photon flux of the second control pulse (and hence emulating the reflection and transmission of a beam splitter). The output mode, resulting from the interaction of the second control pulse with the vapour cell 390 the memory 380 and is directed down the chain to either be interacted with further stored time bins in subsequent memories or directed to a detector for analysis.

The skilled person will appreciate that the boson sampler examples described above in relation to FIGS. 3A-3H are illustrative examples and that a boson sampler may comprise any suitable linear bosonic circuit. Generally speaking, the quantum-classical hybrid algorithms described herein may be implemented using an M-mode boson sampler capable of a set of M−1 multimodal operations and therefore a set of M−1 parameter values.

One example source of errors in photonic circuits is photon loss. Photon loss may increase exponentially with the depth of a photonic circuit—that is, the more optical elements that are used to implement the transformation $U(\theta)$, the more opportunity there is for photons to be lost from the boson sampler. Passive error mitigation techniques, typically based on classical postprocessing, only postpone the inevitable loss of the quantum character of an output distribution which makes the circuit efficiently simulatable classically. Thus, it may be desirable to keep a linear bosonic circuit "shallow" (i.e. not full-depth) in order to reduce the number of components implementing the linear bosonic circuit and thereby reducing the loss of photons.

Advantageously, the quantum-classical hybrid methods described herein can be utilised even with shallow bosonic circuits. In a photonic circuit, this means that a binary optimization problem can be addressed with fewer photonic elements (beam splitters, phase shifters etc.) than would be used with a full-depth circuit, and therefore fewer photons are lost leading to reduced errors in computation.

With a universal interferometer, any unitary transformation may be implemented and photons passing through the input ports may be routed in any configuration to the output ports. Accordingly, with a suitable selection of parameter values for a universal interferometer, photons may be detected in any of the output modes of the output multimodal bosonic state. When a measurement outcome indicates that one or more photons were detected in a particular output mode, the incident event may be mapped to a first value e.g. "1", while if no photons are detected in that particular output mode, the incident event may be mapped to a second value e.g. "0" (see (EQ 4) above). In this way, a measurement outcome may be mapped to a binary sequence for the purposes of implementing the optimization procedure described above in relation to FIG. 1. However, by using one mapping only, not all binary sequences may be reachable by the boson sampler—for example, if photon number is conserved through the universal interferometer, then at least one detector will always detect the presence of photons and so the binary sequence comprising all zeros cannot be resolved $(0,0,0, \ldots, 0)$ despite being a candidate solution to the binary optimization problem. In order to obviate such difficulties, the binary optimization procedure described above in relation to FIG. 1, may be repeated using the complementary mapping (see EQ. 5) i.e. when a measurement outcome indicates that one or more photons were detected in a particular output mode, the incident event may be mapped to the second value e.g. "0", while if no photons are detected in that particular output mode, the incident event may be mapped to the first value e.g. "1". By using both mappings, all 2M binary sequences may be reached by the boson sampler, and hence are within the solution space searched by the binary optimization procedure described herein.

With a shallow boson sampler, the fraction of the candidate binary sequences that cannot be obtained with a single mapping increases, and accordingly it is beneficial to perform the binary optimization process twice, once with a first mapping (e.g. EQ 4) and once with a second mapping (e.g. EQ 5) in order to better determine the globally optimal solution.

Figure 4:
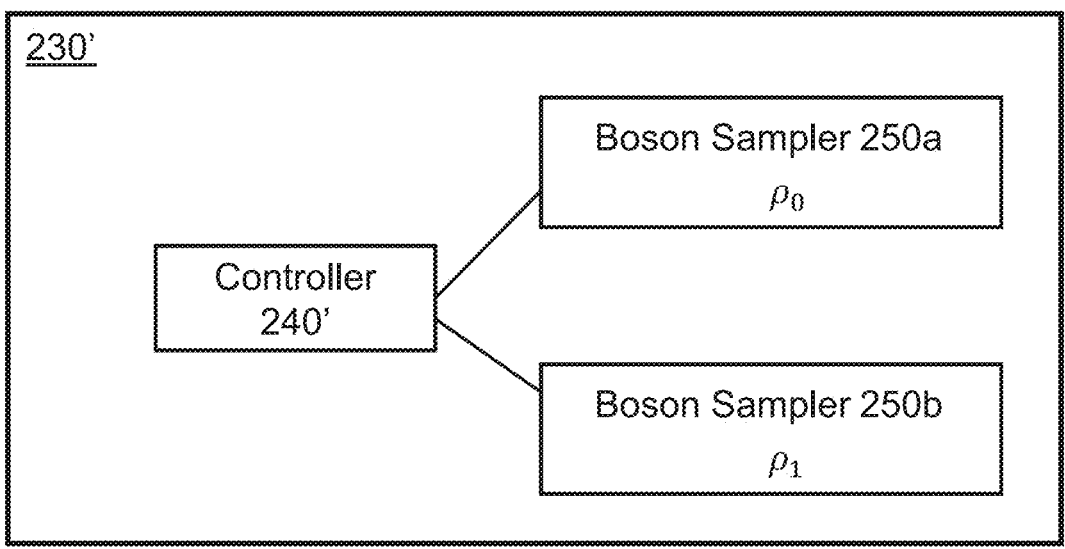
FIG. 4 shows an example of a heterogeneous computing system with two boson samplers.

FIG. 4 shows a block diagram of an alternative heterogeneous computing system 230'. The heterogeneous computing system 230' is suitable for identifying a globally optimal binary sequence of length L=M equal to the number of input modes/output modes of the bosonic states of the boson samplers. In FIG. 4, the heterogeneous computing system 230' comprises a controller 240' and two boson samplers 250a and 250b. The first boson sampler 250a is substantially the same as the second boson sampler 250b. In both boson samplers 250a, 250b, an input multimodal bosonic state comprising M modes, each containing a single photon, is generated and a parametrised unitary transformation is applied to the input state to produce an output multimodal bosonic state that is sampled. The controller 240' is configured to perform a binary optimization process such as that described above in relation to FIG. 1, using the two boson samplers in parallel. When processing measurement outcomes from the first boson sampler 250a, the controller uses the mapping $\rho\_0$ (EQ. 4) such that if a measurement outcome indicates that an output mode contained bosons, the value of the corresponding element of the binary sequence is 1, while if the measurement outcome indicates that an output mode was found to contain no bosons, the value of the corresponding element of the binary sequence is 0. When processing measurement outcomes from the second boson sampler 250b, the controller uses the mapping $\rho\_1$ (EQ. 5) such that if a measurement outcome indicates that an output mode contained bosons, the element of the corresponding character of the binary sequence is 0, while if the measurement outcome indicates that an output mode contained no bosons, the value of the corresponding element of the binary sequence is 1. Advantageously, the heterogeneous computing system 230' is able to compare solutions found using either boson samplers and the globally optimal solution is within the binary sequences that can be found by the heterogeneous computing system 230'.

Figure 5:
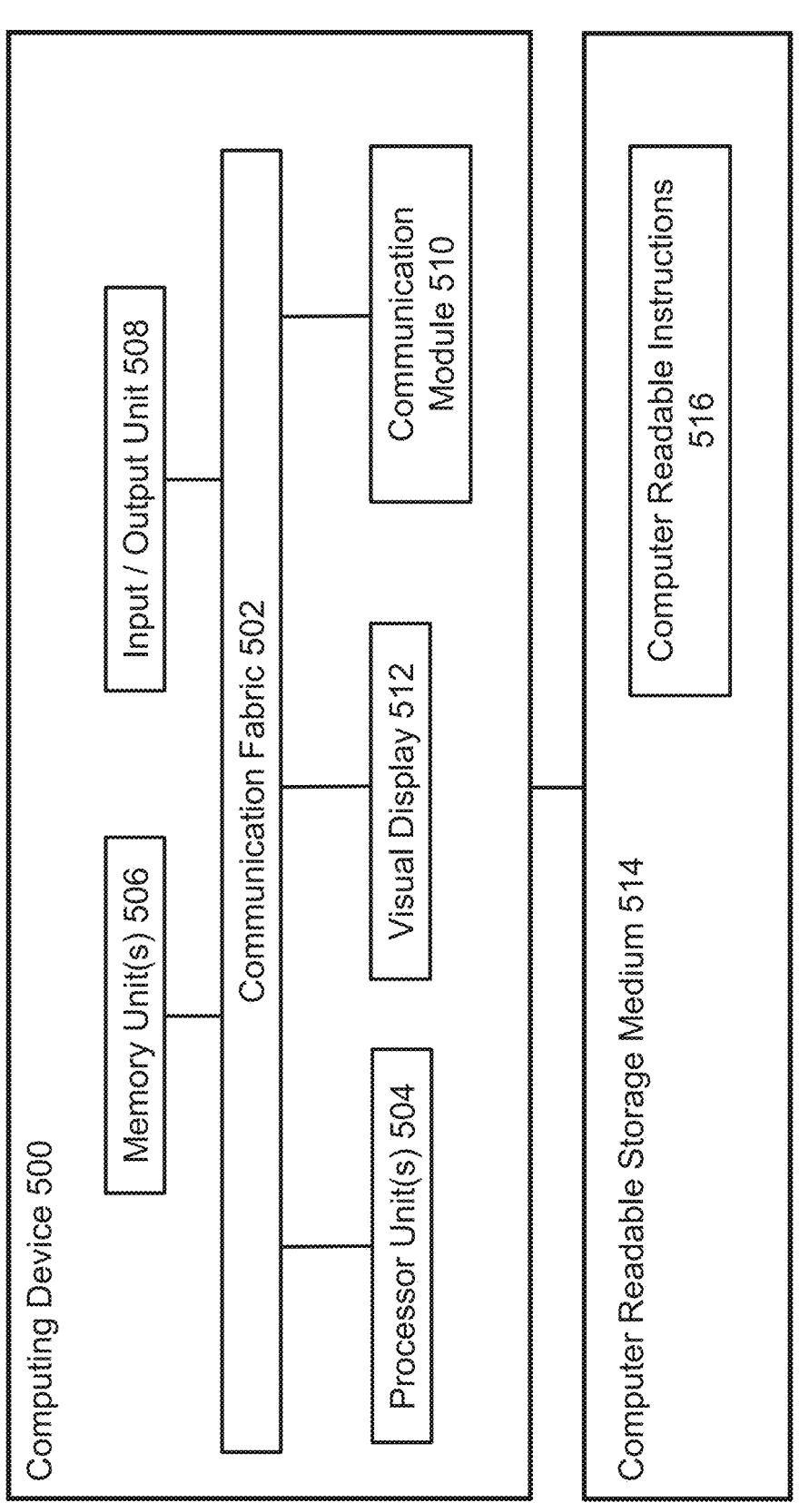
FIG. 5 shows a block diagram of a computing device and a computer-readable medium.

FIG. 5 depicts a block diagram of a data processing system/computing device 500 in which illustrative embodiments may be implemented. The computing device 500 may be implemented as, for example, a server or portable computer and so on. Computing device 500 may be distributed across multiple interconnected devices. Computing device 500 may be suitable for use as a controller 240 or computing apparatus 220. Other architectures to that shown in FIG. 5 may be used as will be appreciated by the skilled person.

Computing device 500 is an example of a computer, in which computer usable program code or instructions implementing the processes may be located. In this example, computing device 500 includes communications fabric 502, which provides communications between processor unit(s) 504, memory unit(s) 506, input/output unit 508, communications module 510, and display 512.

The one or more processing units/processors 504 are configured to execute instructions for software that may be loaded into the memory 506. Processor unit(s) 504 may be a set of one or more processors or may be a multi-processor core, depending on the particular implementation. Furthermore, processor unit(s) 504 may be implemented using one or more heterogeneous processor systems in which a main processor is present with secondary processors on a single chip.

The one or more memory unit(s) 506 may comprise any piece of hardware that is capable of storing information, such as, for example, data, program code in functional form, and/or other suitable information on a temporary basis and/or a permanent basis. The one or more memory units 506 may include, for example, a random access memory or any other suitable volatile or non-volatile storage device. The one or more memory units may include a form of persistent storage, for example a hard drive, a flash memory, a rewritable optical disk, a rewritable magnetic tape, or some combination thereof. The media used for persistent storage may also be removable. For example, the one or more memory units 506 may include a removable hard drive.

Input/Output unit 508 enables the input and output of data with other devices that may be in communication with the computing device 500. For example, input/output unit 508 may provide a connection for user input through a keyboard, a mouse, and/or other suitable devices. The input/output unit 508 may provide outputs to, for example, a printer. In embodiments in which a controller 240 of a heterogeneous computing system 230 comprises computing device 500, the input/output unit 508 may be configured to provide configuration instructions to a boson sampler 250 in order to configure the linear bosonic circuit of the boson sampler 250. The communication module 510 may be further configured to communicate with the boson sampler 250 to cause the boson sampler 250 to be operated and to receive responses from the boson sampler 250).

Communications module 510 enables communications with other data processing systems or devices. The communications module 510 may provide communications through the use of either or both physical and wireless communications links. In embodiments in which a controller 240) of a heterogeneous computing system 230 comprises computing device 500, the communications module 510 may be configured to send and receive communications over a communications network 210. In this way, the controller 240 may communicate with remote computing apparatuses 220.

Instructions for the applications and/or programs may be located in the one or more memory units 506, which are in communication with processor unit 504 through communications fabric 502. Computer-implementable instructions may be in a functional form on persistent storage in the memory unit(s) 506, and may be performed by processor unit 404.

These instructions may sometimes be referred to as program code, computer usable program code, or computer-readable program code that may be read and executed by a processor in processor unit 504. The program code in the different embodiments may be embodied on different physical or tangible computer-readable media.

In FIG. 5, computer-readable instructions are located in a functional form on (e.g., non-transitory) computer-readable storage medium 514 that is selectively removable and may be loaded onto or transferred to computing device 500 for execution by processor unit(s) 405. A computer-readable storage medium may be, for example but not limited to, an electronic, magnetic, optical, electromagnetic, infrared, or semiconductor system, apparatus, device, or any suitable combination thereof. More specific examples of the computer-readable medium include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Alternatively, computer-readable instructions 516 may be transferred to computing device 500 from computer-readable storage medium 514 through a communications link to communications module 510 and/or through a connection to input/output unit 508. The communications link and/or the connection may be physical or wireless.

In some illustrative embodiments, computer-implementable instructions 516 may be downloaded over a network to the memory unit(s) 506 from a remote device for use with computing device 500. For instance, computer-implementable instructions stored in a remote server may be downloaded over a network from the server to the device 500.

The skilled person would appreciate that the architecture described above in relation to FIG. 5 is not intended to provide limitations on the computing devices with which the methods described herein may be implemented. Instead, the skilled person would appreciate that other architectures may be applicable. For example, the computing device may include more or fewer components.

Figure 6:
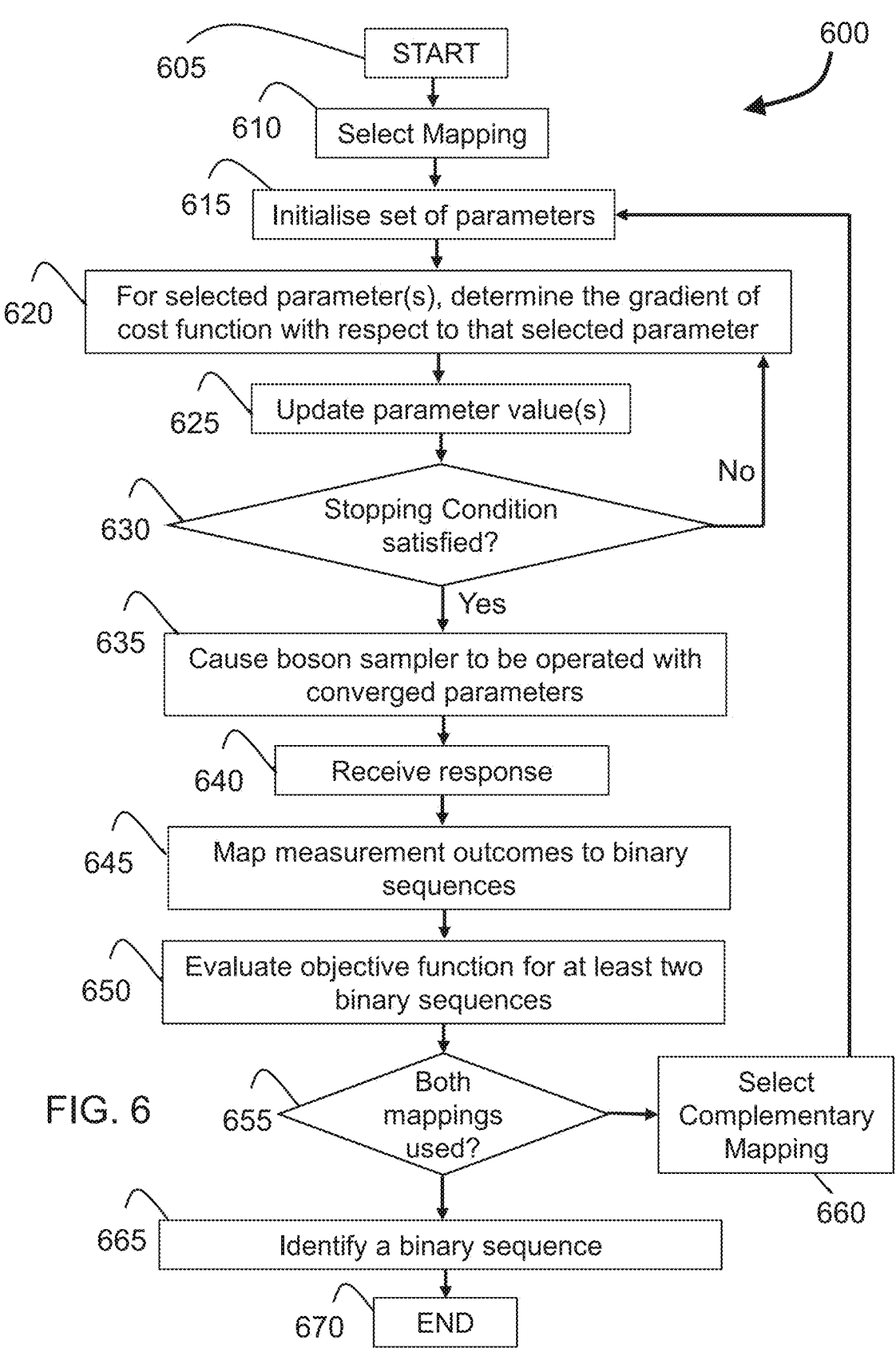
FIG. 6 shows a flow chart of a method for performance by a classical computing device in communication with a boson sampler.

FIG. 6 shows a flowchart of a method 600 for determining a solution to a binary optimization problem.

The task is to identify a binary sequence b of length L to optimize an objective function F (b) that is characteristic of the binary optimization problem. The method 600 may be performed by a hybrid computing apparatus comprising a classical computing resource and a boson sampler, wherein the classical computing resource is able to, directly or indirectly, configure and communicate with the boson sampler. For illustrative purposes only, the method 600 will be described as though performed by the heterogeneous computing system 230 of FIG. 2, comprising a controller 240 and a single boson sampler 250, although the skilled person will appreciate that the method 600 is more widely applicable.

The boson sampler 250 is configured to prepare an input multimodal bosonic state $|\Psi_{IN}\rangle$ comprising N single bosons arranged in M input modes. For the purposes of this discussion, each of the M input modes has a single boson i.e. N=M. The boson sampler 250 is further configured to perform a parametrised unitary transformation of the input multimodal bosonic state $|\Psi_{IN}\rangle$ to an output multimodal bosonic state $|\Psi_{OUT}(\theta)\rangle$ having M output modes. The boson sampler 250 is further configured to perform measurements on output modes of the output multimodal bosonic state to produce measurement outcomes, wherein each measurement outcome indicates the presence or absence of bosons in measured output modes of the output multimodal bosonic state.

The method begins at 605.

At 610, the controller 240 selects a mapping from measurement outcomes to binary sequences. For example, the mapping $\beta_0$ described in (EQ. 4) may be selected.

At 615 the controller 240 selects/initialises a set of parameter values suitable for configuring the linear bosonic circuit 270 of the boson sampler 250. The parameter values may characterise single mode or multimodal operations performed by the linear bosonic circuit. For example, the parameter values may control a phase shift imparted by a phase shifter, or an effective reflection coefficient of a reconfigurable beam splitter. The controller 240 is not required to configure the boson sampler 250 with the initial parameter values.

A penalty function (EQ. 7) may be reduced (e.g., minimised) using gradient descent. The skilled person will appreciate that other minimisation methods may be utilised, for example stochastic gradient descent. In order to perform gradient descent, at each iteration one or more parameter values $\theta_k$ of the set of parameter values $\{\theta\}$ is transformed to $0_k'$ according to:

$$\theta_k' = \theta_k - \eta \frac{\partial E}{\partial \theta_k} \qquad \text{(EQ. 8)}$$

where $\eta$ is a constant referred to as the learning rate. Updating the parameter values $\{\theta\}$ changes the empirical probability distribution that can be obtained by the boson sampler 250, which in turn affects the weights associated with each binary sequence. As can be seen in (EQ. 8) the update to a selected parameter depends on a partial derivative of the cost function with respect to that selected parameter. At 620, for at least one selected parameter, the controller uses the boson sampler 250 to determine a gradient of a cost function with respect to that selected parameter.

The gradient of the cost function with respect to the selected parameter may be found using any suitable method.

According to a first example method for using the boson sampler 250 to determine the gradient of the cost function with respect to the selected parameter, the controller 240 configures the boson sampler 250 to be operated with the current parameter values $\{\theta\}$ and initiates the use of the boson sampler with those parameter values. The boson sampler 250 generates an input state comprising a plurality of input modes, each containing a single boson. The boson sampler 250 further detects the presence or absence of bosons in each output mode of the output multimodal bosonic state. The controller 240 then receives from the boson sampler 250 a response representative of an empirical probability distribution of measurement outcomes. The controller 240 maps the measurement outcomes and the corresponding probabilities to a plurality of binary sequences and their corresponding weightings using the currently selected mapping $\beta_0$ (EQ. 4). The controller then evaluates the cost function $E(\{\theta: \theta_k\})$. The controller 240 next configures the boson sampler 250 such that the selected parameter $\theta_k$ is shifted by a small value e while all other parameter values are maintained and initiates the use of the boson sampler 250. The controller receives a response from the boson sampler 250 representative of an empirical probability distribution of measurement outcomes, maps the measurement outcomes and the corresponding probabilities to a plurality of binary sequences and their corresponding weightings, and then evaluates the cost function $E(\{\theta: \theta_k+\epsilon\})$. The argument $\{\theta: \theta_k+\epsilon\}$ has been used to denote that all current parameter values have been unchanged except for the selected parameter $\theta_k$. The numerical approximation for the gradient of the cost function with respect to the selected parameter can be used:

$$\frac{\partial E}{\partial \theta_k} \simeq \frac{E(\{\theta: \theta_k + \epsilon\}) - E(\{\theta: \theta_k\})}{\epsilon} \qquad \text{(EQ. 9)}$$

To determine the gradient according to (EQ. 9) would typically require great control over all of the parameters of the boson sampler 250 as one requires the amount e to be very small for the approximation of (EQ. 9) to hold (e.g., $\epsilon/\theta_k<0.001$). Furthermore, one would typically use a large number of measurement outcomes to be able to distinguish between the two similar distributions.

A second example method for using the boson sampler 250 to determine the gradient of the cost function with respect to the selected parameter is described in relation to FIG. 7.

At 710, the controller 240 identifies first and second adjusted sets of parameter values. In the first adjusted set, all parameter values of the set of parameter values $\{\theta\}$ are maintained except for the selected parameter Ok, which is adjusted positively by an amount s. In the second adjusted set, all parameter values of the set of parameter values $\{\theta\}$ are maintained except for the selected parameter Ok, which is adjusted negatively by the same amount s.

At 720, the controller 240 causes the boson sampler 250 to be operated with the first adjusted set of parameter values. For example, the controller 240 may send one or more control signals to the boson sampler 250 to configure the parameters of the linear bosonic circuit 270. The controller 240 may send one or more initiation signals to start the boson sampler. At 730, the controller 240 receives a response from the boson sampler, the response representative of an empirical probability distribution of measurement outcomes.

At 740, the controller 240 maps each distinct measurement outcome to a binary sequence of a plurality of binary sequences according to the currently selected mapping. Each element of a binary sequence corresponds to a measured output mode of the output multimodal bosonic state. In this example, as the currently selected mapping is $\rho_0$ (EQ. 4), if a detection event indicates that an output mode contained bosons then the corresponding element of the binary sequence is "1" while if no bosons were detected in that output mode then the corresponding element of the binary sequence is "0".

At 750, the controller 240 determines, from the empirical probability distribution of measurement outcomes, a weighting (EQ. 6) for each binary sequence to which a measurement outcome is mapped.

At 760, the method comprises evaluating the cost function (EQ. 7) for the first adjusted set using the plurality of binary sequences and the weightings of the binary sequences to obtain a first adjusted cost value $E(\{\theta: \theta_k+s\})$.

Steps 720 to 760 are repeated for the second adjusted set to obtain a second adjusted cost value $E(\{\theta: \theta_k-s\})$. The skilled person will appreciate that the order in which the first and second adjusted cost values are obtained is not important.

Once it is determined (770) that both adjusted cost values are obtained, the method proceeds to 780. At 780, the controller 240 determines, from the adjusted cost values for the first and second adjusted sets, a gradient of the cost function $E(\{\theta\})$ with respect to the selected parameter $\theta_k$. In particular, the gradient is evaluated from:

$$\frac{\partial E(\{\theta\})}{\partial \theta_k} = \frac{E(\{\theta: \theta_k + s\}) - E(\{\theta: \theta_k - s\})}{2 \sin s} \qquad \text{(EQ. 10)}$$

Determining the gradient of the cost function $E(\{\theta\})$ with respect to the selected parameter Ok in this way is beneficial as the amount s by which the selected parameter $\theta_k$ is adjusted need not be very small. Advantageously, this means that the empirical probability distributions from which the adjusted cost values $E(\{\theta: \theta_k+s\})$ and $E(\{\theta: \theta_k-s\})$ are derived can be easier to distinguish. Furthermore, the amount s may be chosen based on the physical hardware used to implement the boson sampler. For example, in a photonic system it may be more feasible to shift the selected parameter by an amount $\pi/2$.

Whether the gradient is computed according to the first example method described above (EQ. 9) or the second example method described above (EQ. 10), evaluating the cost function (EQ. 7) may require the objective function F to be evaluated for all distinct binary sequences that are mapped to by measurement outcomes of the boson sampler 250. The controller 240 optionally stores in memory 506 the minimal function value of the objective function F that is found when evaluating the objective function F on these binary sequences, and stores the corresponding binary sequence. Whenever the objective function F needs to be evaluated in determining a gradient, the resulting function value can be compared with the minimum value stored in memory and replace said value if found to be more optimal.

Returning again to FIG. 6, once the one or more gradients have been determined, at 625 the controller 240 updates the current set of parameter values $\{\theta\}$.

At 630 the controller 240 determines whether a stopping condition has been satisfied. Any suitable stopping condition may be utilised.

For example, determining that a stopping condition has been satisfied may comprise determining that the set of parameter values have been updated a threshold number of times i.e. that the parameter values have been updated for a threshold number of iterations/epochs. The threshold number of iterations may be selected in advance by a user of the controller 240.

As another example, a stopping condition may comprise a convergence criterion. Determining that a convergence criterion has been met may comprise determining that the cost function has not changed more than a threshold amount between updates of the parameter values. As another example, determining that a convergence criterion has been met may comprise evaluating a function of the weightings of the binary sequences, such as an entropic measure of the weightings, and determining that the function is less than or greater than a predetermined threshold value.

If the stopping condition has not been satisfied, then the method returns to step 620. If the stopping condition has been satisfied, then the method proceeds to step 635.

At 635, the controller 240 causes the boson sampler 250 to be operated with the finalised set of parameter values $\{\theta_{cov}\}$ i.e. the parameter values after the stopping condition has been satisfied. At 640 a response is received from the boson sampler configured with those finalised parameter values, the response representative of an empirical probability distribution of measurement outcomes.

At 645, the controller 240 maps each distinct measurement outcome to a binary sequence of a plurality of binary sequences according to the current mapping. Each element of a binary sequence corresponds to a measured output mode of the output multimodal bosonic state, and each element has a value based on whether or not bosons were detected in that output mode At 650, the controller 240 evaluates, for each of at least two binary sequences b to which a measurement outcome is mapped, the objective function F(b) using the binary sequence to determine a corresponding function value.

The gradient descent method performed does not guarantee that, after operating the boson sampler 250 with the finalised parameters, the binary sequence with the greatest weighting is the globally optimal solution to the binary optimization problem. By iteratively tuning the parameters of the boson sampler 250, the bosonic distribution sampled by the state detection module 280 is iteratively updated, causing some binary sequences to be weighted more heavily than others. However, due to the probabilistic nature of quantum measurement, the fact that binary sequences have different multiplicities (i.e. different numbers of measurement outcomes that map to them) and the fact that the boson sampler is operated only a finite number $N_S$ of times to produce each distribution, mean that several binary sequences are likely to have weightings that are notably greater than the others. The iterative process reduces the number of candidate binary sequences of length L from $2^L$ to a number that is manageable on a classical computing resource. Accordingly, the controller 240 evaluates the objective function for at least two of the binary sequences to which a measurement outcome is mapped, but preferably evaluates the objective function for several binary sequences to which a measurement outcome is mapped. The choice of which binary sequence(s) to check may be based on any suitable criteria. For example, the controller 240 may evaluate the objective function for those binary sequences whose weighting is greater than a threshold value. In some examples, the controller 240) may evaluate the objective function for every binary sequence that corresponds to a measurement outcome received from the boson sampler operating with the finalised parameters (all binary sequences of length L having a non-zero weighting) as for high dimensional problems (large L) this is still far fewer sequences to check than the original $2^L$ candidate solutions.

The controller 240 may compare the minimal found function value with a function value stored previously in memory 506 and update the function value and binary sequence stored in the memory 506 if the minimal found function value is found to be more optimal than the previously stored function value. That is, the minimal found function value may be compared with the best function value found in the process of determining a gradient (at 620).

At 655, the controller 240 determines that only one mapping has so far been used and so selects a complementary mapping (660), in this example mapping $\rho_1$ (EQ. 5). The method then returns to step 615 (a new set of initial parameter values for the boson sampler are selected) and progresses through to step 650 as before, using the complementary mapping whenever required. In this way, the heterogeneous computing system 230 has the possibility of finding an optimal binary sequence from the full search space of 24 candidate binary sequences.

At 665, the controller 240 identifies a binary sequence as a solution to the binary optimization problem. The binary sequence has this been identified based at least in part on a comparison of the function values generated by operating the boson sampler with finalised parameter values, at least once for a first mapping and at least once for a second mapping complementary to the first mapping.

At 670, the method of FIG. 6 ends.

The skilled person will appreciate that the method described above in relation to FIG. 6 may be varied in several ways. For example, with two boson samplers, a first boson sampler may be used to perform steps 605 to 650 with one mapping and the second boson sampler may be used to perform steps 605 to 650 with a complementary mapping.

One binary optimization problem that may be addressed using the methods described herein is Quadratic Unconstrained Binary Optimization (QUBO). QUBO is usually formulated as the problem of finding the binary sequence b that minimizes an objective function F (b) of the following form:

$$F(b) = b^T Q b \qquad \text{(EQ. 11)}$$

where b is a binary sequence (in vector form) of length L and Q is a real, symmetric matrix of dimension L×L.

As an example, a quantum-classical hybrid algorithm as described herein was simulated to find a binary sequence of L=20 binary values to minimise a randomly generated 20×20 symmetric matrix. More particularly, a shallow boson sampler such as that shown in FIG. 3E was simulated, with an input multimodal bosonic state comprising twenty temporal input modes (M=20) each containing a single photon (N=20). The simulated linear bosonic circuit comprised a single temporal mode coupling device comprising a reconfigurable beam splitter and a delay line. In the simulation, the numbers of bosons in all twenty of the output modes were measured and accordingly each measurement outcome comprised a string of twenty integers. A set of nineteen parameter values (corresponding to nineteen transmittance values of the reconfigurable beam splitter 360 of FIG. 3E for implementing nineteen multimodal operations between consecutive modes) was optimized to minimize a cost function $E(\{\theta\})$ (see EQ. 7) using gradient descent with a fixed learning rate of n=0.1 (see EQ. 8). Gradients at each iteration were computed using the method of FIG. 7. Every time the simulated boson sampler was operated, the number of measurement outcomes was taken to be $N_S$=100. All parameter values were updated in every iteration, and the stopping condition used was that the iteration has been performed 60 times (60 updates).

Figure 8A:
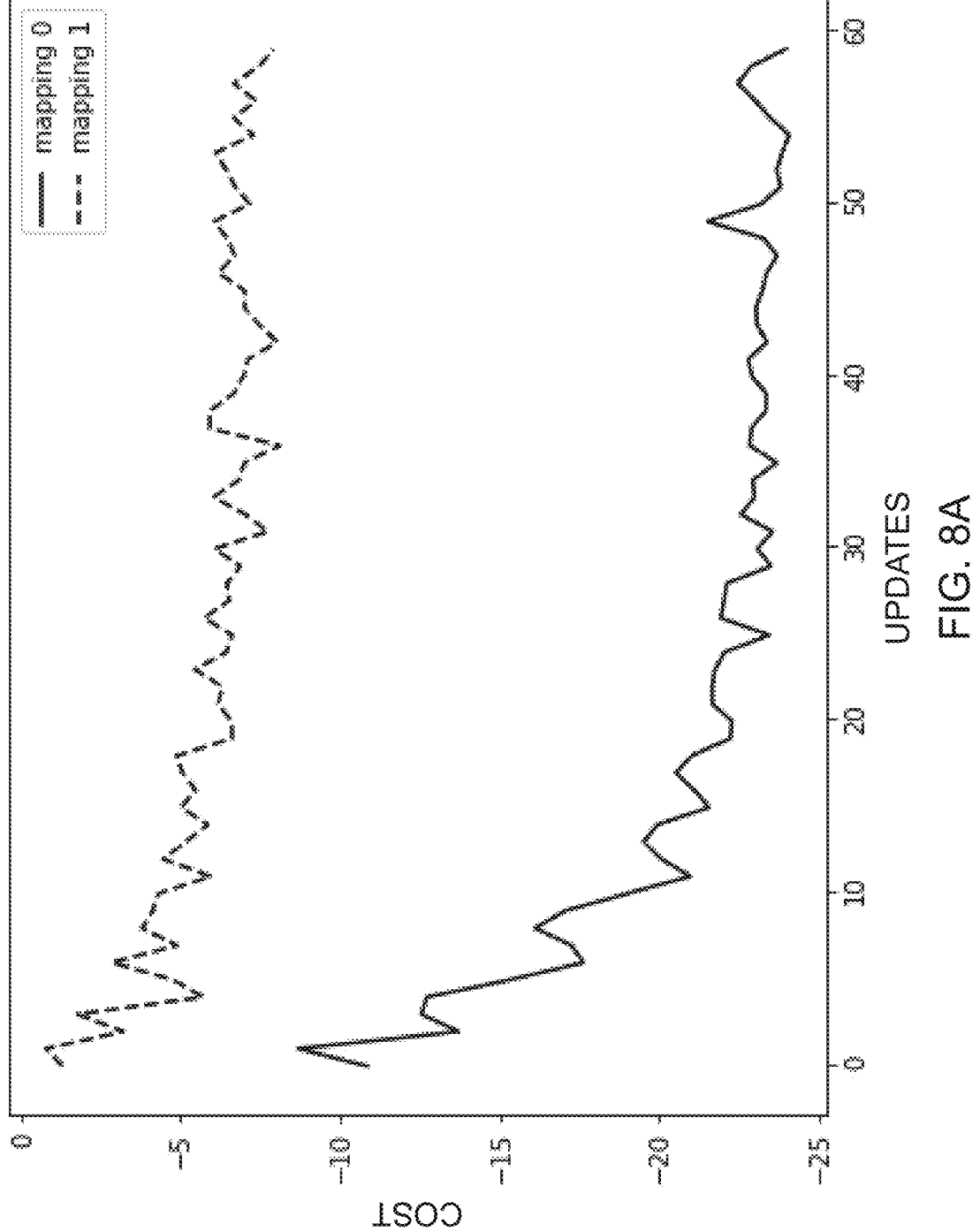
FIG. 8A shows a graph illustrating how a cost function changed over sixty epochs when solving a first example problem.

Gradient descent was performed for both classical mappings (EQs. 4 and 5) in turn. FIG. 8A shows how the cost function of (EQ. 7), labelled "cost" in the figure, converged over the course of the 60 iterations. On the x-axis, the iteration number is shown, and on the y-axis the cost $E(\{\theta\})$ is plotted. In the graph, the solid curve labelled "mapping 0" corresponds to the mapping $\rho_0$ of (EQ. 4) and the dashed curve labelled "mapping 1" corresponds to the mapping $\rho_1$ of (EQ. 5). As can be seen in the graph, over the course of the 60 epochs, both mappings tended towards convergence, although "mapping 0" tended to convergence around a lower cost value than the "mapping 1" curve, which indicates that the optimal binary sequence was not reachable when using "mapping 1" but as reachable when using "mapping 0".

For both mappings, if a "better" binary sequence was found when evaluating the cost function during gradient descent, this binary sequence was stored in memory. Once the stopping condition was satisfied (in this example, 60 updates of the parameter values had been performed) the boson sampler was simulated with the corresponding finalised parameter values to produce a further $N_S=100$ measurement outcomes, which were then mapped to binary sequences. The objective function was evaluated for all of these 100 measurement outcomes and a comparison was made to the "best" binary sequence stored in memory to return an optimal binary sequence. For this example, the binary optimization process was able to find a 20-variable binary sequence that reduced (e.g., minimised) the objective function (in this particular example, the minimal function value was −29.3). Separately, a brute force approach verified that the minimal function value was −29.3 and that the binary sequence identified was optimal.

As the randomly generated matrix was of size 20×20, the number of evaluations of the objective function required for a brute force search for the solution is two to the power of twenty, which is over one million evaluations. In contrast, for the methods described herein the number of evaluations is proportional to four multiplied by the size of the parameter value set (i.e. the number of parameters to be updated) multiplied by the number of iterations performed multiplied by the number of samples $N_S$ taken each time. The factor of four arises because there are two mappings and because two cost function values are determined when determining the gradient of the cost with respect to a parameter (if one follows the method of FIG. 7). In this example, the number of evaluations of the objective function is around 456,000.

Figure 8B:
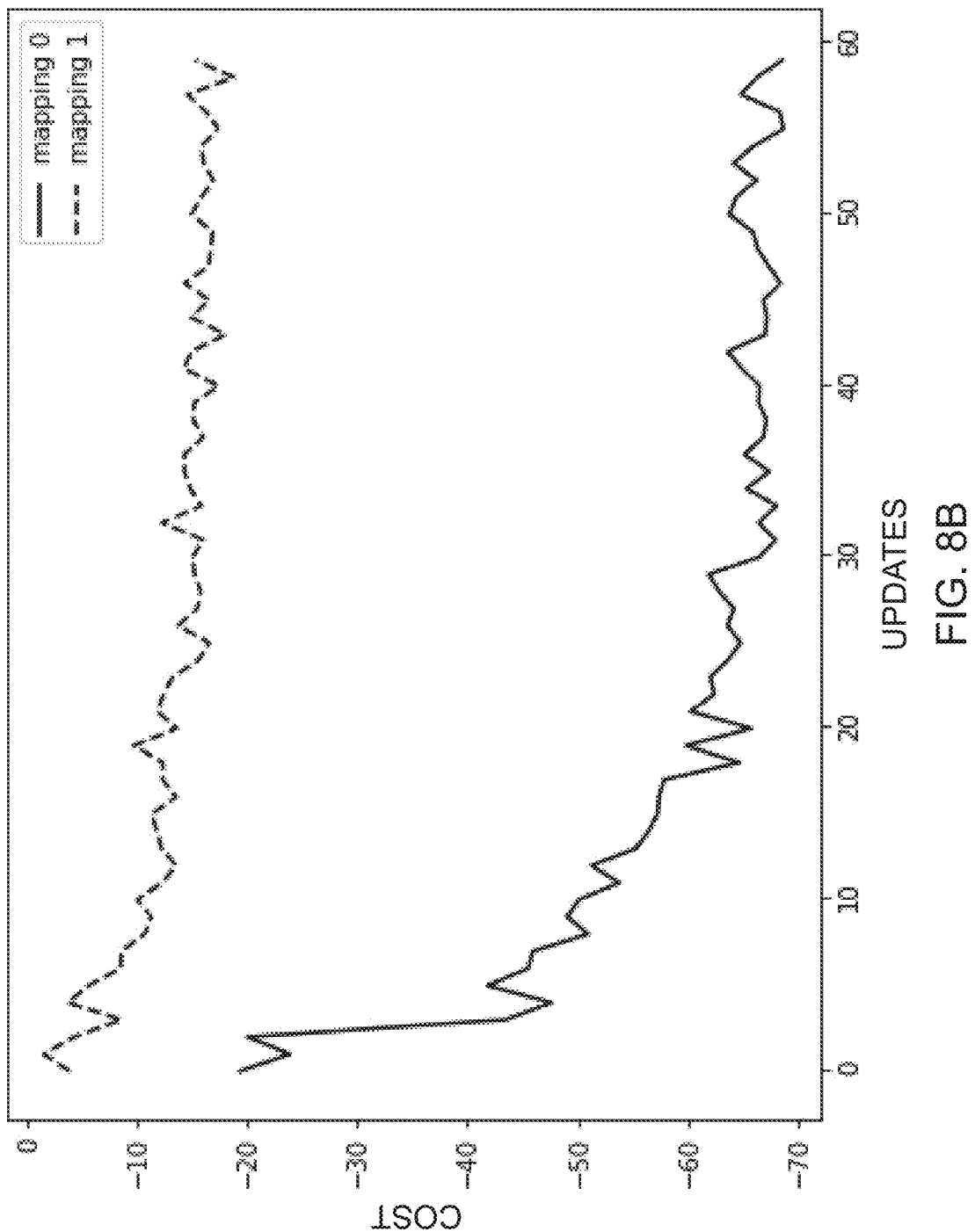
FIG. 8B shows a graph illustrating how a cost function changed over sixty epochs when solving a second example problem.

As the size of the problem grows, the difference between the number of evaluations of the objective function using the binary optimization methods described herein and the number of evaluations required for a brute force search increases greatly. For example, with a similar setup to that used in generating FIG. 8A, a binary optimization problem characterised by the QUBO objective function of (EQ. 11) was solved for a randomly generated, symmetric matrix Q of size 50×50. A brute force search would require a check of two to the power of fifty different binary sequences, which is impractical on a classical computer, while the number of evaluations of the objective function required using the method of FIG. 6 is proportional to one billion one hundred and seventy six thousand. FIG. 8B shows how the cost function behaved over the course of sixty iterations. In this example, the binary optimization procedure found a binary sequence that resulted in an objective function value of −97.7.

Variations of the methods and systems described herein are envisaged, and a few such variations are mentioned below.

The methods and systems described herein may be used in conjunction with any suitable binary optimization problem. For example, a binary optimization problem may comprise a quadratic unconstrained binary optimization (QUBO) problem. A binary optimization problem may comprise, for example, a travelling salesman problem. A binary optimization problem may comprise a portfolio optimization problem.

Any suitable boson sampler may be utilised in conjunction with the methods and systems described herein.

In the examples described above, the learning rate was fixed. However, this is not a requirement and an adaptive learning rate.

In the examples described above in relation to FIGS. 8A and 8B, all of the parameter values were updated at every iteration. The skilled person will appreciate that this is not required—at each iteration a subset of the set of parameter values may be selected for updating.

In the examples described above, the number of measurement outcomes was the same $N_S$ every time the boson sampler is used. However, the number may be varied for different uses of the sampler.

As will be appreciated by one skilled in the art, the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit." "module" or "system." Furthermore, aspects of the present disclosure may take the form of a computer program product embodied in any one or more computer-readable medium/media having computer usable program code embodied thereon.

Aspects and embodiments of the present disclosure are described herein with reference to flowchart illustrations and/or block diagrams of methods, apparatus (systems) and computer program products according to illustrative examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Each feature disclosed in this specification (including any accompanying claims, abstract or drawings), may be replaced by alternative features serving the same, equivalent or similar purpose, unless expressly stated otherwise. Thus, unless expressly stated otherwise, each feature disclosed is one example only of a generic series of equivalent or similar features. The disclosure is not restricted to the details of any foregoing embodiments. The disclosure extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

What is claimed is:

1. A system comprising:
   a photonic boson sampler comprising:
   a set of one or more light sources configured to generate an input state comprising a plurality of input modes;
   a reconfigurable shallow interferometer comprising one or more configurable parameters, the reconfigurable shallow interferometer configured to generate an output state comprising a plurality of output modes by performing a transformation on the input state, wherein the transformation is dependent on one or more parameter values of the one or more configurable parameters; and
   an arrangement of one or more photon detectors configured to produce a measurement outcome indicative of a presence or absence of photons in the plurality of output modes of the output state; and
   a controller configured to:
   receive measurement outcomes from the photonic boson sampler, the measurement outcomes generated by the photonic boson sampler being operated multiple times;
   generate binary sequences based on the measurement outcomes, wherein values of the binary sequences are based on the presence or absence of photons in output modes of output states generated by the photonic boson sampler; and
   determine a solution to a binary optimization problem based at least in part on the generated binary sequences.

2. The system of claim 1, wherein to generate the binary sequences, the controller is configured to:
   map a first measurement outcome to a first binary sequence, wherein each element of the first binary sequence corresponds to an output mode of a first output state and has a value based on whether one or more photons were present or absent in the output mode.

3. The system of claim 1, wherein:
   the input state of the photonic boson sampler comprises M input modes, wherein M is an integer greater than or equal to two; and
   the reconfigurable shallow interferometer comprises fewer than M(M−1)/2 multimodal operations.

4. The system of claim 1, wherein the plurality of input modes of the input state are a plurality of temporal modes.

5. The system of claim 4, wherein the reconfigurable shallow interferometer comprises one or more temporal mode coupling devices, wherein a temporal mode coupling device comprises a reconfigurable beam splitter and a delay line, the delay line configured to connect one input port of the reconfigurable beam splitter with one output port of the reconfigurable beam splitter.

6. The system of claim 5, wherein the reconfigurable beam splitter is capable of coupling modes with a reconfigurable reflection coefficient.

7. The system of claim 5, wherein the reconfigurable beam splitter comprises a Mach-Zehnder interferometer.

8. The system of claim 4, wherein the reconfigurable shallow interferometer comprises one or more temporal mode coupling devices, wherein a temporal mode coupling device comprises a quantum memory.

9. The system of claim 1, wherein the plurality of input modes of the input state are a plurality of spatial modes.

10. The system of claim 9, wherein the reconfigurable shallow interferometer comprises a spatial interferometer, the spatial interferometer comprising:
   M input ports for inputting M input modes of the input state into the spatial interferometer;
   M output ports for outputting M output modes of the output state from the spatial interferometer; and
   a plurality of waveguides arranged to pass through the spatial interferometer to connect the M input ports to the M output ports;
   wherein the plurality of waveguides are arranged to provide a plurality of coupling locations between pairs of the plurality of waveguides, wherein a reconfigurable beam splitter is arranged at each of the plurality of coupling locations such that at each coupling location of the plurality of coupling locations two modes of electromagnetic radiation carried by a pair of waveguides are capable of coupling with each other with a reconfigurable reflection coefficient.

11. The system of claim 10, wherein the plurality of coupling locations are arranged such that at least one of the M input modes couples with each of the other M−1 input modes in the spatial interferometer.

12. The system of claim 10, wherein the spatial interferometer comprises fewer than M(M−1)/2 coupling locations.

13. The system of claim 10, wherein the reconfigurable shallow interferometer is comprised in an integrated photonic circuit.

14. The system of claim 1, wherein:
   the controller is configured to receive the measurement outcomes and generate the binary sequences until a stopping condition is satisfied; and
   the controller is further configured to:
   until the stopping condition is satisfied, update the one or more parameter values of the one or more configurable parameters based on an objective function characteristic of the binary optimization problem; and
   when the stopping condition is satisfied, receive further measurement outcomes from the photonic boson sampler and generate further binary sequences based on the further measurement outcomes, wherein the controller is configured to determine the solution to the binary optimization problem based at least in part on the generated further binary sequences.

15. A method for using a photonic boson sampler to determine a solution to a binary optimization problem, wherein the photonic boson sampler is operable to: prepare an input state comprising a plurality of input modes; generate an output state comprising output modes by performing a transformation on the input state using a reconfigurable shallow interferometer; and produce measurement outcomes indicative of a presence or absence of photons in the output modes of the output state, the method comprising:
   receiving measurement outcomes from the photonic boson sampler, the measurement outcomes generated by the photonic boson sampler being operated multiple times;
   generating binary sequences based on the measurement outcomes, wherein values of the binary sequences are based on the presence or absence of photons in output modes of output states generated by the photonic boson sampler, and
   determining the solution to the binary optimization problem based at least in part on the generated binary sequences.

16. The method of claim 15, wherein determining the solution to the binary optimization problem comprises:

determining function values by evaluating an objective function using at least two of the generated binary sequences, the objective function characteristic of the binary optimization problem; and identifying, based at least in part on a comparison of the function values, a binary sequence as the solution to the binary optimization problem.

17. The method of claim 15, wherein generating the binary sequences comprises:

mapping a first measurement outcome to a first binary sequence, wherein each element of the first binary sequence corresponds to an output mode of a first output state and has a value based on whether one or more photons were present or absent in the output mode.

18. The method of claim 15, wherein generating the binary sequences comprises:

mapping a first measurement outcome to a first binary sequence according to a first mapping under which each element of the first binary sequence corresponds to an output mode of a first output state and has a first value if one or more photons were present in the output mode of the first output state and a second value if no photons were present in the output mode of the first output state; and mapping a second measurement outcome different than the first measurement outcome to a second binary sequence according to a second mapping under which each element of the second binary sequence corresponds to an output mode of a second output state and has the second value if one or more photons were present in the output mode of the second output state and the first value if no photons were present in the output mode of the second output state.

19. A non-transitory computer-readable storage medium comprising stored instructions that, when executed by a computing device, cause the computing device to perform operations, wherein the computing device is communicatively coupled to a photonic boson sampler operable to: prepare an input state comprising a plurality of input modes; generate an output state comprising output modes by performing a transformation on the input state using a reconfigurable shallow interferometer; and produce measurement outcomes indicative of a presence or absence of photons in the output modes of the output state, the operations including:

receiving measurement outcomes from the photonic boson sampler, the measurement outcomes generated by the photonic boson sampler being operated multiple times;

generating binary sequences based on the measurement outcomes, wherein values of the binary sequences are based on the presence or absence of photons in output modes of output bosonic states generated by the photonic boson sampler; and determining a solution to a binary optimization problem based at least in part on the generated binary sequences.

* * * * *